United States Patent
Kao et al.

(10) Patent No.: US 11,238,374 B2
(45) Date of Patent: Feb. 1, 2022

(54) METHOD FOR VERIFYING TRAINING DATA, TRAINING SYSTEM, AND COMPUTER READABLE MEDIUM

(71) Applicant: HTC Corporation, Taoyuan (TW)

(72) Inventors: Hao-Cheng Kao, Taoyuan (TW); Chih-Yang Chen, Taoyuan (TW); Chun-Hsien Yu, Taoyuan (TW); Shan-Yi Yu, Taoyuan (TW); Edzer Lienson Wu, Taoyuan (TW); Che-Han Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 292 days.

(21) Appl. No.: 16/548,864

(22) Filed: Aug. 23, 2019

(65) Prior Publication Data

US 2020/0065623 A1    Feb. 27, 2020

Related U.S. Application Data

(60) Provisional application No. 62/798,482, filed on Jan. 30, 2019, provisional application No. 62/792,908, (Continued)

(51) Int. Cl.
*G06N 20/00* (2019.01)
*G06K 9/62* (2006.01)
(Continued)

(52) U.S. Cl.
CPC ........... *G06N 20/00* (2019.01); *G06K 9/6215* (2013.01); *G06K 9/6227* (2013.01); *G06K 9/6256* (2013.01); *G06N 5/04* (2013.01);
*G06T 7/70* (2017.01); *G06T 11/20* (2013.01); *G06T 11/60* (2013.01); *G06T 2207/20081* (2013.01); *G06T 2210/12* (2013.01)

(58) Field of Classification Search
CPC . G06N 20/00; G06N 5/04; G06T 7/70; G06T 11/20; G06T 11/60; G06T 2207/20081; G06T 2210/12; G06K 9/6215; G06K 9/6227; G06K 9/6256
See application file for complete search history.

(56) References Cited

U.S. PATENT DOCUMENTS 5,974,169 A * 10/1999 Bachelder ................. G06T 7/12
                                                    382/151
6,249,594 B1 * 6/2001 Hibbard ............... G06T 7/0012
                                                    382/128
(Continued)

*Primary Examiner* — Manav Seth
(74) *Attorney, Agent, or Firm* — JCIPRNET

(57) ABSTRACT

The disclosure provides a method for verifying training data, a training system, and a computer program produce. The method includes: receiving a labelled result with a plurality of bounding regions, wherein the labelled result corresponds to an image, the bounding regions are labelled by a plurality of annotators, the annotators comprises a first annotator and a second annotator, and the bounding region comprises a first bounding region labelled by the first annotator and a second bounding region labelled by the second annotator; and determining the first bounding region and the second bounding region respectively corresponds to different two target objects or corresponds to one target object according to a similarity between the first bounding region and the second bounding region.

18 Claims, 23 Drawing Sheets

Related U.S. Application Data filed on Jan. 16, 2019, provisional application No. 62/722,182, filed on Aug. 24, 2018.

(51) Int. Cl.
    *G06T 7/70*    (2017.01)
    *G06N 5/04*    (2006.01)
    *G06T 11/20*   (2006.01)
    *G06T 11/60*   (2006.01)

(56) References Cited

U.S. PATENT DOCUMENTS

| | | | | |
|---|---|---|---|---|
| 6,263,113 | B1 * | 7/2001 | Abdel-Mottaleb | G06K 9/00248 382/237 |
| 6,597,808 | B1 * | 7/2003 | Guo | G06K 9/2054 382/173 |
| 6,832,002 | B2 * | 12/2004 | Baatz | G06T 7/11 382/171 |
| 6,859,548 | B2 * | 2/2005 | Yoshioka | A61B 8/08 128/922 |
| 7,646,476 | B2 * | 1/2010 | Huet | G01N 21/8851 356/237.4 |
| 8,416,260 | B1 * | 4/2013 | Carpenter | G06T 15/503 345/619 |
| 8,494,258 | B2 * | 7/2013 | Yokono | G06K 9/6256 382/159 |
| 8,645,359 | B2 * | 2/2014 | Heimendinger | G06F 16/434 707/722 |
| 9,117,100 | B2 * | 8/2015 | Sheng | G06T 7/246 |
| 9,117,259 | B2 * | 8/2015 | Liu | G06T 7/41 |
| 9,256,807 | B1 * | 2/2016 | Shlens | G06K 9/6215 |
| 9,275,308 | B2 * | 3/2016 | Szegedy | G06K 9/4628 |
| 9,275,450 | B2 * | 3/2016 | Ramachandran | G06T 7/0004 |
| 9,442,957 | B2 * | 9/2016 | Petrou | G06F 16/5838 |
| 9,449,247 | B2 * | 9/2016 | Yamada | G06T 7/12 |
| 9,459,626 | B2 * | 10/2016 | Chen | G08G 1/0129 |
| 9,483,701 | B1 * | 11/2016 | Kwatra | G06K 9/468 |
| 9,491,318 | B2 * | 11/2016 | Swire | H04N 1/00196 |
| 9,495,606 | B2 * | 11/2016 | Shi | G06Q 10/087 |
| 9,594,984 | B2 * | 3/2017 | Yu | G06K 9/6201 |
| 9,697,439 | B2 * | 7/2017 | Gaidon | G06K 9/6256 |
| 9,740,956 | B2 * | 8/2017 | Chen | G06T 7/12 |
| 9,852,363 | B1 * | 12/2017 | Shlens | G06K 9/6215 |
| 9,911,066 | B2 * | 3/2018 | Jewell | G06K 9/6227 |
| 9,996,772 | B2 * | 6/2018 | Ahmed | G06T 7/73 |
| 9,996,890 | B1 * | 6/2018 | Cinnamon | G06K 9/627 |
| 10,037,471 | B2 * | 7/2018 | Satzoda | G06K 9/6223 |
| 10,133,921 | B2 * | 11/2018 | Cervin | G06K 9/00463 |
| 10,157,332 | B1 * | 12/2018 | Gray | G06K 9/00671 |
| 10,169,702 | B2 * | 1/2019 | Chang | G06N 5/003 |
| 10,213,692 | B2 * | 2/2019 | Velic | G06K 9/6255 |
| 10,268,922 | B2 * | 4/2019 | Kaestle | G06K 9/6215 |
| 10,339,417 | B2 * | 7/2019 | Padubrin | G06K 9/48 |
| 10,339,669 | B2 * | 7/2019 | Kwant | G06T 7/75 |
| 10,366,293 | B1 * | 7/2019 | Faviero | G06N 3/0454 |
| 10,388,014 | B2 * | 8/2019 | Yuan | G06T 7/0012 |
| 10,395,385 | B2 * | 8/2019 | Zhou | G06K 9/4604 |
| 10,424,064 | B2 * | 9/2019 | Price | G06N 3/08 |
| 10,445,877 | B2 * | 10/2019 | Albrecht | G06K 9/00476 |
| 10,489,684 | B2 * | 11/2019 | Choi | G06K 9/3241 |
| 10,504,261 | B2 * | 12/2019 | Cinnamon | G06T 1/0007 |
| 10,572,963 | B1 * | 2/2020 | Cinnamon | G06K 9/46 |
| 10,579,897 | B2 * | 3/2020 | Redmon | G06K 9/4619 |
| 10,678,847 | B2 * | 6/2020 | Guo | G06F 16/51 |
| 10,699,126 | B2 * | 6/2020 | Karyodisa | G06K 9/00248 |
| 10,747,224 | B2 * | 8/2020 | Michalakis | B60W 60/0015 |
| 10,748,035 | B2 * | 8/2020 | Lee | G06K 9/6267 |
| 10,861,302 | B2 * | 12/2020 | Sawides | G08B 13/1961 |
| 10,885,777 | B2 * | 1/2021 | Annapureddy | G06K 9/628 |
| 10,902,051 | B2 * | 1/2021 | Hu | G06N 20/00 |
| 10,922,589 | B2 * | 2/2021 | Sargent | G06N 3/0454 |
| 10,956,784 | B2 * | 3/2021 | Gray | G06T 11/60 |
| 10,957,055 | B2 * | 3/2021 | Razumkov | G06K 9/46 |
| 10,984,529 | B2 * | 4/2021 | Carter | G16H 30/40 |
| 10,984,532 | B2 * | 4/2021 | Sargent | G06N 3/0454 |
| 10,991,097 | B2 * | 4/2021 | Yip | G06T 7/0012 |
| 11,004,236 | B2 * | 5/2021 | Mustafi | G06K 9/033 |
| 11,017,266 | B2 * | 5/2021 | Irshad | G06N 3/0454 |
| 11,069,048 | B2 * | 7/2021 | Xu | G06K 9/6267 |
| 2010/0226564 | A1 * | 9/2010 | March | G06K 9/469 382/159 |
| 2012/0271821 | A1 * | 10/2012 | Qin | G06F 16/3346 707/728 |
| 2014/0085545 | A1 * | 3/2014 | Tu | G06K 9/6292 348/659 |
| 2014/0108302 | A1 * | 4/2014 | Chang | G06F 16/68 706/11 |
| 2014/0185925 | A1 * | 7/2014 | Datta | G06K 9/6256 382/159 |
| 2014/0328527 | A1 * | 11/2014 | Zhou | G06T 7/149 382/131 |
| 2015/0170006 | A1 * | 6/2015 | Cohen | G06K 9/6297 382/180 |
| 2015/0199592 | A1 * | 7/2015 | Kim | G06K 9/6282 382/202 |
| 2016/0098619 | A1 * | 4/2016 | Gaidon | G06K 9/6212 382/159 |
| 2016/0103816 | A1 * | 4/2016 | Grady | G06K 9/00369 715/231 |
| 2017/0371935 | A1 * | 12/2017 | Nguyen | G06F 16/248 |
| 2018/0089505 | A1 * | 3/2018 | El-Khamy | G06T 7/73 |
| 2019/0015059 | A1 * | 1/2019 | Itu | A61B 6/502 |
| 2019/0034831 | A1 * | 1/2019 | Perona | G06F 16/48 |
| 2019/0130188 | A1 * | 5/2019 | Zhou | G06T 7/248 |
| 2019/0130580 | A1 * | 5/2019 | Chen | G06K 9/2054 |
| 2019/0313963 | A1 * | 10/2019 | Hillen | G06N 3/0454 |
| 2019/0362185 | A1 * | 11/2019 | Irshad | G06K 9/3241 |
| 2020/0143205 | A1 * | 5/2020 | Yao | G06K 9/6262 |
| 2020/0146646 | A1 * | 5/2020 | Tuzoff | G06T 7/0012 |
| 2020/0381105 | A1 * | 12/2020 | Bernard | G06K 9/6267 |
| 2021/0073977 | A1 * | 3/2021 | Carter | G16H 50/20 |
| 2021/0073987 | A1 * | 3/2021 | Tegzes | G06T 7/0012 |
| 2021/0089841 | A1 * | 3/2021 | Mithun | G06K 9/4604 |

* cited by examiner

| Raw data | R01 | R02 | R03 | R04 | R05 | R06 | R07 | R08 | R09 | R10 |
|---|---|---|---|---|---|---|---|---|---|---|
| annotatorA | C | C | D | D | D | D | D | C | C | D |
| annotatorB | C | D | D | D | D | D | C | C | C | C |
| annotatorC | C | D | D | C | D | D | D | C | C | C |
| CL | H | M | H | M | H | H | M | H | H | M | consistency calculation (pairwise comparison)
First inter-annotator consistency: $R_{AB}=0.6$ (6 out of 10)
Second inter-annotator consistency: $R_{AC}=0.8$ (8 out of 10)
Third inter-annotator consistency: $R_{BC}=0.8$ (8 out of 10)

FIG. 3

|  | R01' | R02' | R03' | R04' | R05' | R06' | R07' | R08' | R09' | R10' |
|---|---|---|---|---|---|---|---|---|---|---|
| Correct Answer | C | C | D | D | D | D | D | C | C | D |
| annotatorB | C | D | D | C | D | D | C | C | C | C |
| annotatorC | C | D | D | D | D | D | D | C | C | C |

Test scores
annotator B = 0.6
annotator C = 0.8

FIG. 7

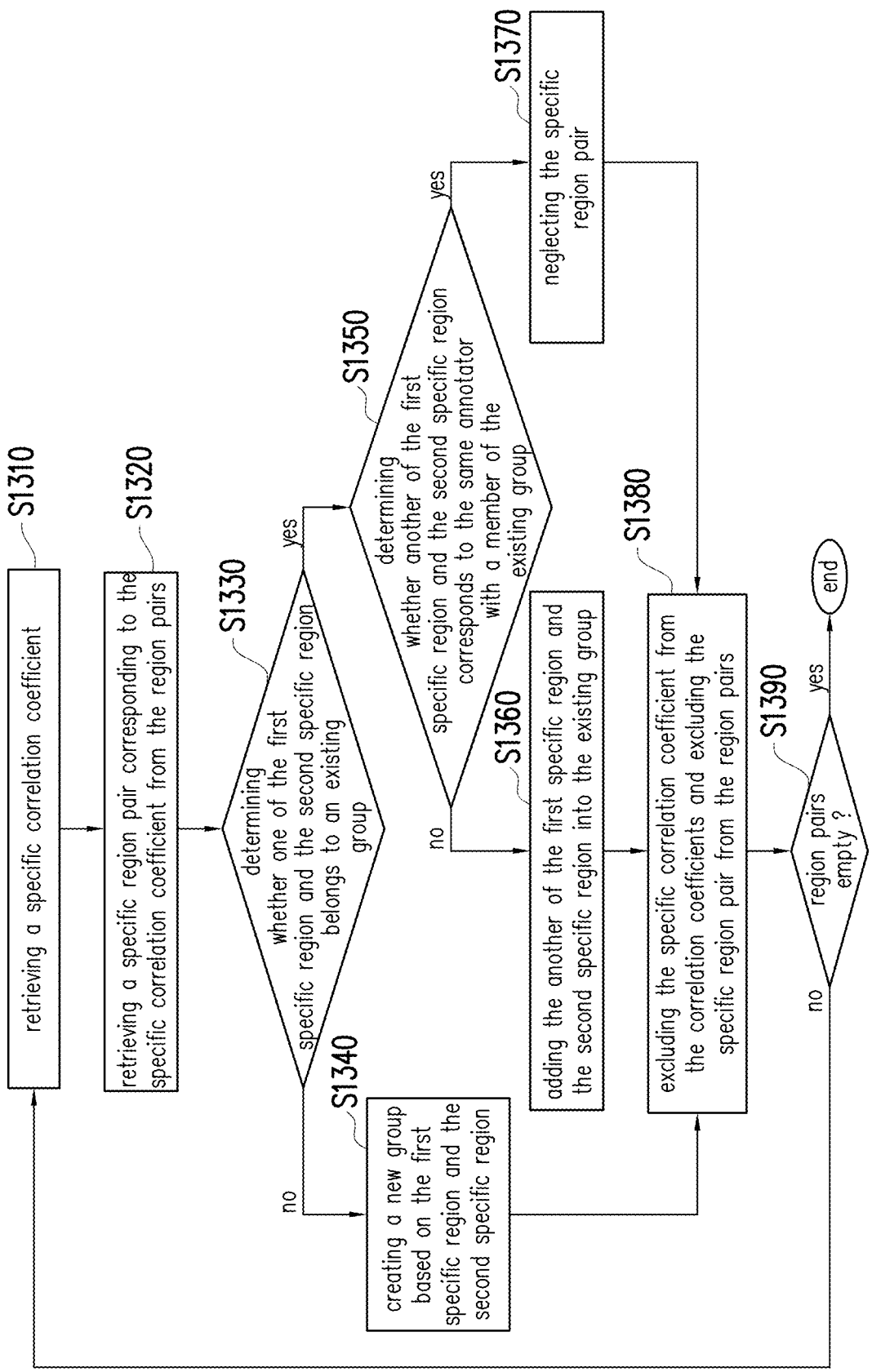

METHOD FOR VERIFYING TRAINING DATA, TRAINING SYSTEM, AND COMPUTER READABLE MEDIUM

CROSS-REFERENCE TO RELATED APPLICATION

This application claims the priority benefit of U.S. provisional application Ser. No. 62/722,182, filed on Aug. 24, 2018, U.S. provisional application Ser. No. 62/792,908, filed on Jan. 16, 2019, and U.S. provisional application Ser. No. 62/798,482, filed on Jan. 30, 2019. The entirety of each of the above-mentioned patent applications is hereby incorporated by reference herein and made a part of this specification.

BACKGROUND OF THE INVENTION

1. Field of the Invention

The present invention generally relates to the training mechanism of artificial intelligence, in particular, to a method for verifying training data, training system, and computer program product.

2. Description of Related Art

In the field of artificial intelligence (AI), the quality of the training data used to train the AI machine plays an important role. If the training data is accurately labelled, the AI machine may better learn from the training data, and hence the accuracy of the generated AI model may be correspondingly improved. However, if the training data is inaccurately labelled, the learning process of the AI machine would be sabotaged, and hence the performance of the generated AI model may be correspondingly degraded.

Therefore, it is crucial for the people in the art to design a mechanism for determining whether the training data are good enough to be used to train the AI machine.

SUMMARY OF THE INVENTION

Accordingly, the present disclosure provides a method for receiving a labelled result with a plurality of bounding regions, wherein the labelled result corresponds to an image, the bounding regions are labelled by a plurality of annotators, the annotators comprises a first annotator and a second annotator, and the bounding region comprises a first bounding region labelled by the first annotator and a second bounding region labelled by the second annotator; and determining the first bounding region and the second bounding region respectively corresponds to different two target objects or corresponds to one target object according to a similarity between the first bounding region and the second bounding region.

The present disclosure provides a training system including a storage circuit and a processor. The storage circuit stores a plurality of modules. The processor is coupled to the storage circuit and accessing the modules to perform following steps: receiving a labelled result with a plurality of bounding regions, wherein the labelled result corresponds to an image, the bounding regions are labelled by a plurality of annotators, the annotators comprises a first annotator and a second annotator, and the bounding region comprises a first bounding region labelled by the first annotator and a second bounding region labelled by the second annotator; and determining the first bounding region and the second bounding region respectively corresponds to different two target objects or corresponds to one target object according to a similarity between the first bounding region and the second bounding region.

The present disclosure provides a computer program product for use in conjunction with a training system, the computer program product including a computer readable storage medium and an executable computer program mechanism embedded therein, the executable computer program mechanism including instructions for: receiving a labelled result with a plurality of bounding regions, wherein the labelled result corresponds to an image, the bounding regions are labelled by a plurality of annotators, the annotators comprises a first annotator and a second annotator, and the bounding region comprises a first bounding region labelled by the first annotator and a second bounding region labelled by the second annotator; and determining the first bounding region and the second bounding region respectively corresponds to different two target objects or corresponds to one target object according to a similarity between the first bounding region and the second bounding region.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view of labelled results created by annotators according to an embodiment of the disclosure.

FIG. 7 is a schematic view of comparing the labelled results of the annotators with correct answers according to an embodiment of the disclosure.

FIG. 13C shows the mechanism of merging the bounding regions into the groups.

DESCRIPTION OF THE EMBODIMENTS

Figure 1A:
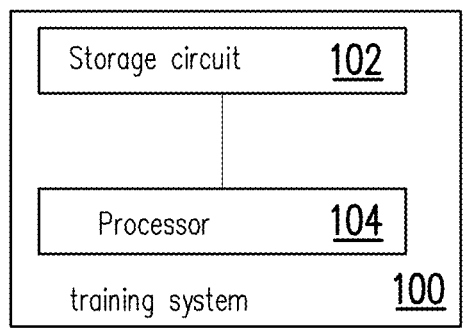
FIG. 1A is a functional diagram of a training system for verifying training data according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1A, which is a functional diagram of a training system for verifying training data according to an embodiment of the disclosure. In various embodiments, the training system 100 may be implemented as, for example, a smart phone, a personal computer (PC), a notebook PC, a netbook PC, a tablet PC, or other electronic device, but the disclosure is not limited thereto. In various embodiments, the training system 100 may be an artificial intelligence (AI) platform that provides at least one labelling tool for annotators to perform labelling works. In the following descriptions, the mechanism related to the labelling tools may be referred to as image classification and object detection, wherein the image classification may exemplarily correspond to FIG. 3, and the object detection may exemplarily correspond to FIG. 11, but the disclosure is not limited thereto.

In the present embodiment, the training system 100 includes a storage circuit 102 and a processor 104. The storage circuit 102 may be one or a combination of a stationary or mobile random access memory (RAM), read-only memory (ROM), flash memory, hard disk, or any other similar device, and which records a plurality of programs or modules that can be executed by the processor 104.

The processor 104 may be coupled to the storage circuit 102. In various embodiments, the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

The processor 104 may access the programs stored in the storage circuit 102 to perform the method for verifying training data of the present disclosure, and the detailed discussions will be provided hereinafter.

Roughly speaking, the training system 100 may be used to train an AI machine based on a plurality of training data after verifying the training data via the method proposed in the following, wherein the training data may be implemented by a plurality of labelled results created by a plurality of annotators A, B, and C via labelling raw data.

Figure 1B:
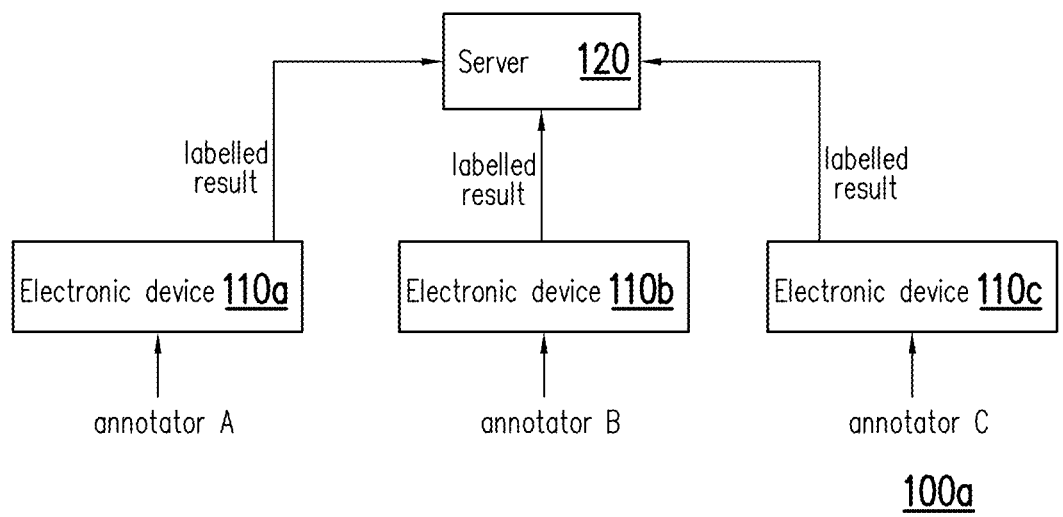
FIG. 1B shows a schematic view of a training system for verifying training data according to another embodiment of the disclosure.

In some other embodiments, the training system 100 may be modified to be the aspect as shown in FIG. 1B. See FIG. 1B, a training system 100a may include a plurality of electronic devices 110a, 110b, 110c, and a server 120. The electronic devices 110a-110c (e.g., personal computers or the like) may be respectively used for the annotators A, B, C to create the labelled results by labelling raw data and accordingly transmit the labelled results of the annotators A, B, and C to the server 120. Thereafter, the server 120 may use the labelled results from the electronic devices 110a-110c to train the AI machine after verifying the labelled results via the method proposed in the following.

Since the mechanism performed by the processor 104 in FIG. 1A and the server 120 in FIG. 1B are basically the same, the discussion in the following will be focused on the operations performed by the processor 104 for brevity.

Figure 2:
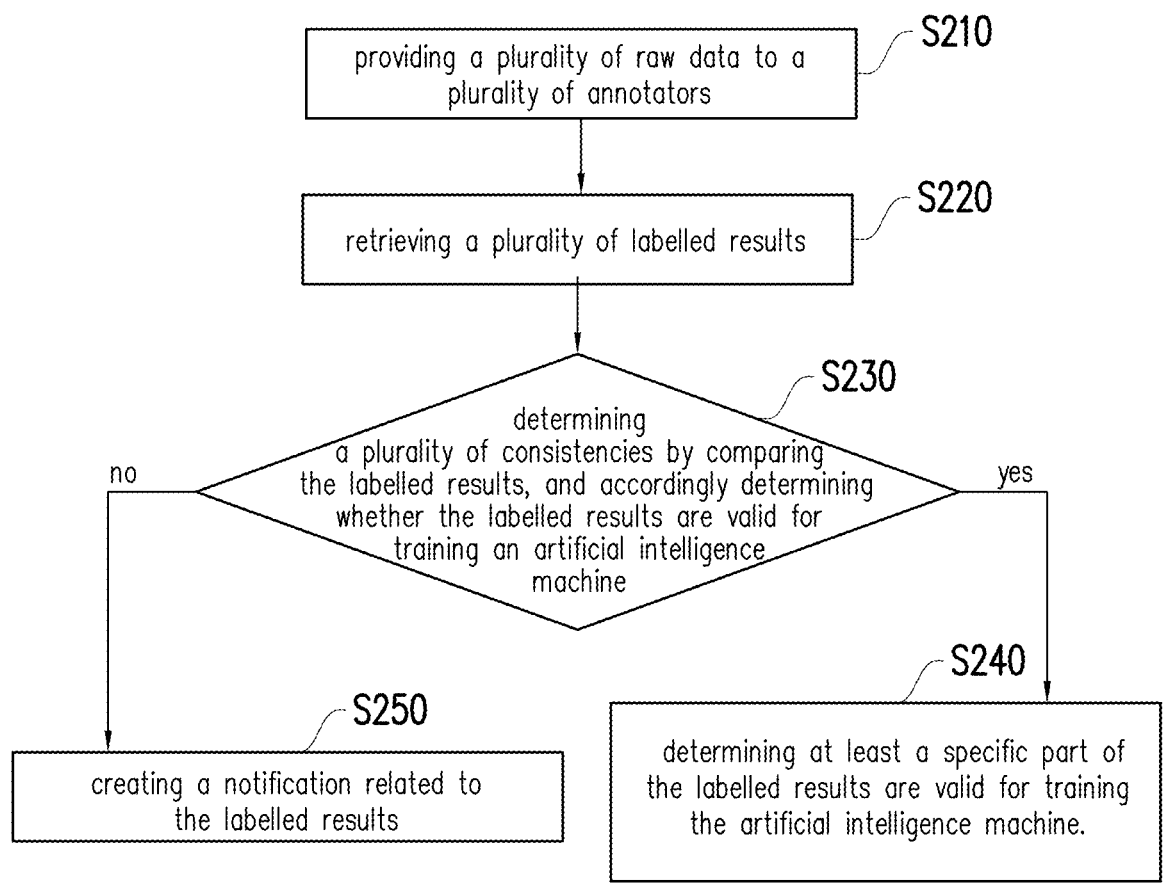
FIG. 2 illustrates the method for verifying training data according to an embodiment of the disclosure.

Referring to FIG. 2 and FIG. 3, FIG. 2 illustrates the method for verifying training data according to an embodiment of the disclosure, and FIG. 3 is a schematic view of labelled results created by annotators according to an embodiment of the disclosure. The method shown in FIG. 2 may be implemented by the training system 100 of FIG. 1A. The details of each step of FIG. 2 will be described below with reference to the elements shown in FIG. 1A and the scenario shown in FIG. 3.

In step S210, a plurality of raw data R01, R02, ..., R09, and R10 may be provided to annotators A, B, and C. In the present embodiment, each of the raw data R01-R10 may be an image of a cat or a dog for the annotators A-C to identify, but the disclosure is not limited thereto. In other embodiments, the raw data may by other types of images, such as human images, medical images, etc.

For example, when the raw data R01 is presented to the annotator A, the annotator A may recognize the raw data R01 as an image with a cat, and hence the annotator A may use "C" (which may be regarded as a labelled data LD011) to label the raw data R01. For the annotators B and C, since they may also recognize the raw data R01 as an image with a cat, and hence the may both use "C" (which may be regarded as labelled data LD012 and LD013) to label the raw data R01. For another example, when the raw data R10 is presented to the annotator A, the annotator A may recognize the raw data R10 as an image with a dog, and hence the annotator A may use "D" (which may be regarded as a labelled data LD101) to label the raw data R10. For the annotators B and C, since they may recognize the raw data R10 as an image with a cat, and hence the may both use "C" (which may be regarded as labelled data LD102 and LD103) to label the raw data R10. The meanings of other labelled data in FIG. 3 may be deduced from the above teachings, which would not be repeated herein.

For the ease of the following discussions, the labelled data of the annotators on the same raw data will be collectively referred as a labelled result, and the labelled data of one annotator on all of the raw data would be collectively referred as a labelled data set.

Under this situation, the labelled data LD011, LD012, and LD013 of the annotators A, B, C on the raw data R01 may be collectively referred as a labelled result LR01, and the labelled data LD101, LD102, and LD103 of the annotators A, B, C on the raw data R10 may be collectively referred as a labelled result LR10. The labelled data made by the annotator A on the raw data R01-R10 may be referred as a labelled data set LDS1; the labelled data made by the annotator B on the raw data R01-R10 may be referred as a labelled data set LDS2; and the labelled data made by the annotator C on the raw data R01-R10 may be referred as a labelled data set LDS3, but the disclosure is not limited thereto.

In step S220, a plurality of labelled results may be retrieved. In the present embodiment, the labelled results of the annotators A-C on labelling the raw data R01-R10, such as the labelled results LR01 and LR10, may be retrieved after the annotators A-C finish their labelling tasks on the raw data R01-R10.

In one embodiment, the confidence level (CL) of the annotators A-C on labelling one of the raw data may be further retrieved. The confidence level may depend on the consistency of the annotators A-C on labelling one of the raw data. For example, since all of the annotators A-C label "C" for the raw data R01, the consistency of the annotators A-C on labelling the raw data R01 is high. Therefore, the confidence level related to the raw data R01 may be "H" (which stands for high). For another example, since the annotators A-C inconsistently labelled the raw data R10, the confidence level related to the raw data R10 may be labelled as "M" (which stands for moderate). In other embodiments, the confidence level related to each of the raw data may be used as a reference while the labelled results are used to train an artificial (AI) machine, which would be discussed later.

In step S230, a plurality of consistencies may be determined based on the labelled results, and whether the labelled results are valid for training the AI machine may be accordingly determined. If yes, in step S240, at least a specific part of the labelled results may be saved as a database for training the AI machine; otherwise, in step S250, a notification related to the labelled results may be created.

In one embodiment, the consistencies of the annotators A-C may include a first inter-annotator consistency (represented by $R_{AB}$) between the annotators A and B. The first inter-annotator consistency may be obtained by comparing the labelled data set LDS1 with the labelled data set LDS2 and proportional to a first consistency between the labelled data set LDS1 and the labelled data set LDS2. As shown in FIG. 3, since the annotators A and B consistently labelled 6 of the raw data out of all of the raw data R01-R10, the first inter-annotator consistency (i.e., $R_{AB}$) may be characterized as 0.6.

In addition, the consistencies of the annotators A-C may include a second inter-annotator consistency (represented by $R_{AC}$) between the annotators A and C and a third inter-annotator consistency (represented by $R_{BC}$) between the annotators B and C. The second inter-annotator consistency may be obtained by comparing the labelled data set LDS1 with the labelled data set LDS3 and proportional to a second consistency between the labelled data set LDS1 and the labelled data set LDS3. As shown in FIG. 3, since the annotators A and C consistently labelled 8 of the raw data out of all of the raw data R01-R10, the second inter-annotator consistency (i.e., $R_{AC}$) may be characterized as 0.8. Similarly, the third inter-annotator consistency may be obtained by comparing the labelled data set LDS2 with the labelled data set LDS3 and proportional to a third consistency between the labelled data set LDS2 and the labelled data set LDS3. As shown in FIG. 3, since the annotators B and C consistently labelled 8 of the raw data out of all of the raw data R01-R10, the third inter-annotator consistency (i.e., $R_{BC}$) may be characterized as 0.8.

In one embodiment, an intra-annotator consistency of each of the annotators may be further calculated to characterize the labelling consistency of each of the annotators. Specifically, the raw data may be modified to include a first raw data and a second raw data identical to the first raw data. In this case, the intra-annotator consistency of a certain annotator may be proportional to the consistency of the certain annotator labelling the first raw data and the second raw data and may be obtained as the same way of obtaining the inter-annotator consistency. For example, the intra-annotator consistency may be obtained by the similarity between the regions of interest (ROI) labelled by the certain annotator in the first raw data and the second raw data. The more the ROIs overlapped with each other, the higher the intra-consistency is. If the intra-annotator consistency of the certain annotator is high, it represents that the performance of the certain annotator on labelling the raw data is stable, and vice versa. See FIGS. 4A and 4B for further discussions.

Figure 4A:
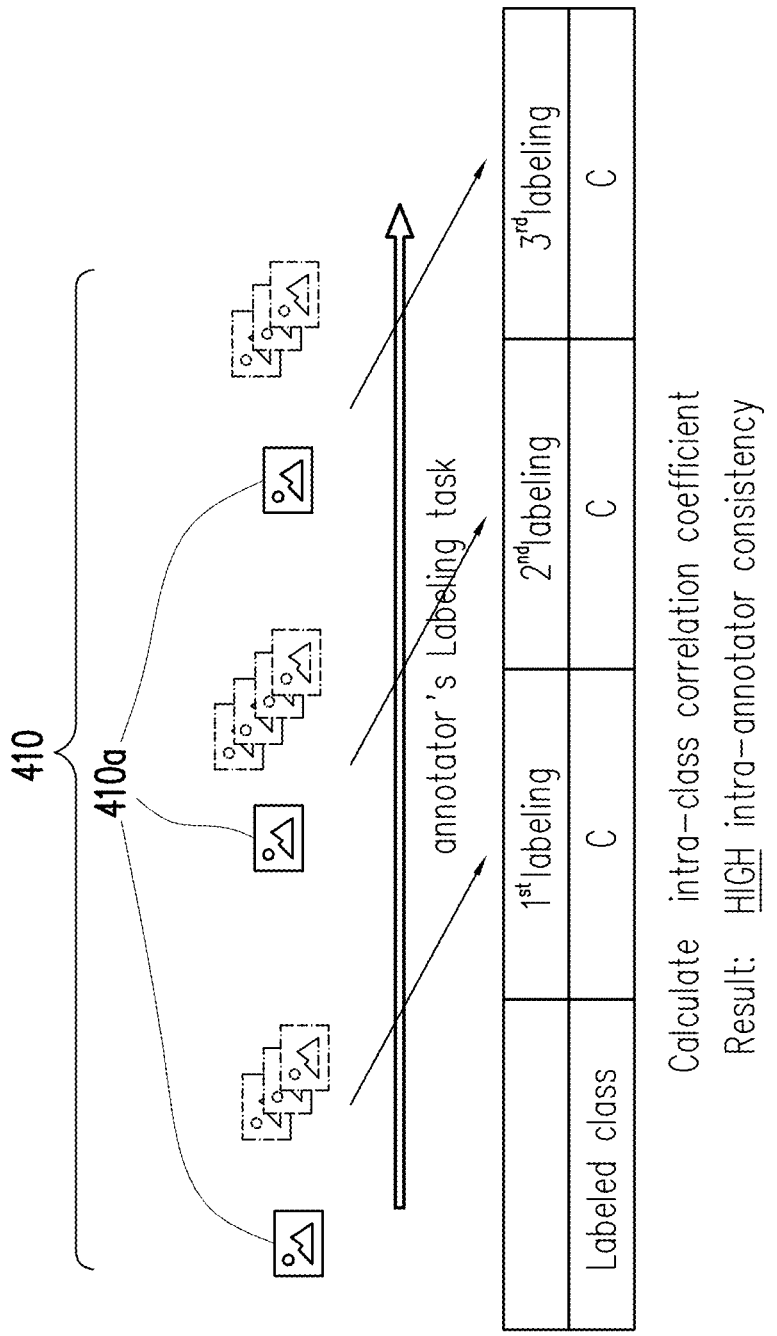
FIG. 4A shows a schematic view of an annotator with stable labelling performance according to an embodiment of the disclosure.

FIG. 4A shows a schematic view of a annotator with stable labelling performance according to an embodiment of the disclosure. In FIG. 4A, a bunch of raw data 410 are provided to a annotator, wherein the raw data 410 includes, for example, three identical raw data 410a for the annotator to perform the labelling task. As shown in FIG. 4A, since the annotator consistently label the three raw data as the class "C", the processor 104 may obtain a high intra-annotator consistency of the annotator after calculation the intra-class correlation coefficient.

Figure 4B:
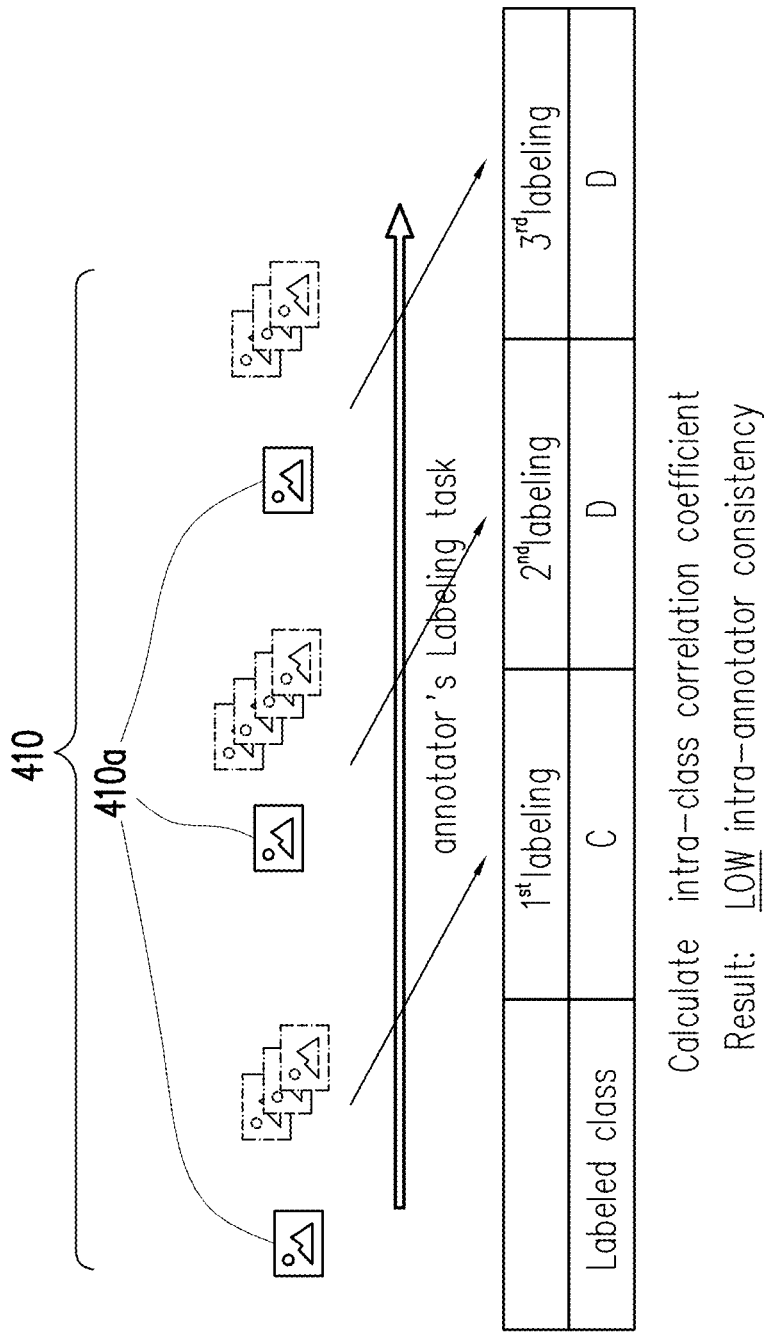
FIG. 4B shows a schematic view of an annotator with unstable labelling performance according to an embodiment of the disclosure.

On the contrary, FIG. 4B shows a schematic view of an annotator with unstable labelling performance according to an embodiment of the disclosure. In FIG. 4B, the raw data 410 with three identical raw data 410a may be provided to another annotator to perform the labelling task. As shown in FIG. 4B, since the other annotator inconsistently label the three raw data 410a as different classes, the processor 104 may obtain a low intra-annotator consistency of the annotator after calculation the intra-class correlation coefficient.

In other embodiments, if the annotators are asked to label the raw data in different ways, such as labelling a region of interest (ROI) by labelling a bounding region in each of the raw data, the way of obtaining/calculating the consistencies may be correspondingly modified. For example, if the annotators are asked to label the region of a tumor in a computed tomography (CT) image, the inter-annotator consistency between any two of the annotators may be characterized by the similarities of the ROIs labelled by the two annotators in each of the raw data. In various embodiments, these similarities may be obtained by algorithms such as Dice similarity indices/Jaccard index method, Cohen's Kappa method, Fleiss' Kappa method, Krippendorff's alpha method, and/or the intra-class correlation coefficient method, but the disclosure is not limited thereto.

Figure 5:
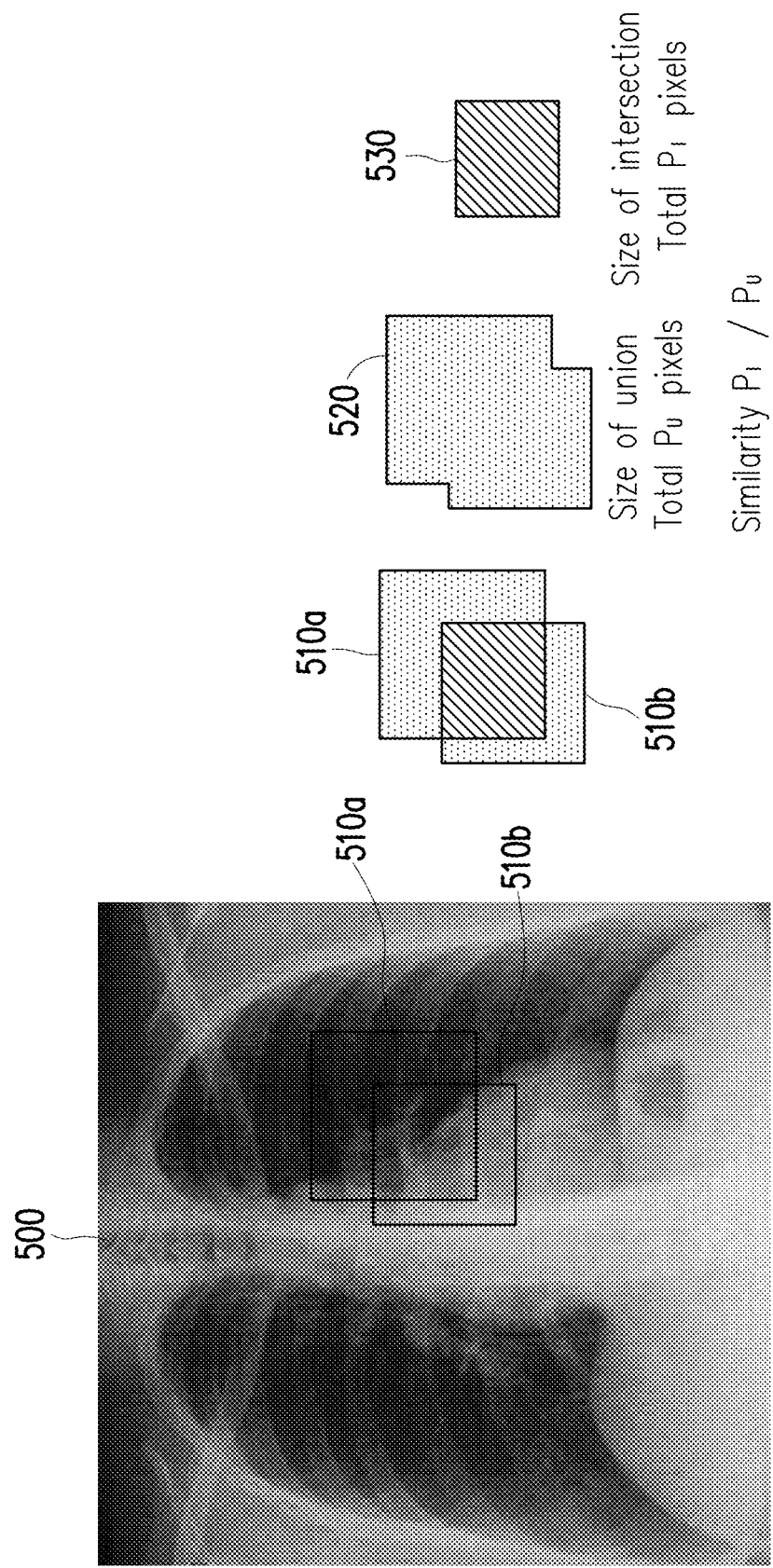
FIG. 5 shows a mechanism of obtaining the similarity of ROIs.

For further discussion, Dice similarity indices/Jaccard index method shown in FIG. 5 will be used as an example for determining the inter-annotator consistency. In FIG. 5, a raw data 500 is provided for the annotators A and B, and the annotators A and B are asked to label ROIs (e.g., a tumor) in the raw data 500. The ROIs 510a and 510b are respectively labelled by the annotators A and B. Based on the principles of Dice similarity indices/Jaccard index method, the processor 104 may determine the size of the union 520 (represented by $P_U$ pixels) of the ROIs 510a and 510b and the size of the intersection 530 (represented by $P_I$ pixels) of the ROIs 510a and 510b. Afterwards, the similarity between the ROIs 510a and 510b may be obtained by $P_I/P_U$ (i.e., intersection over union, IoU), but the disclosure is not limited thereto.

In one embodiment, if all of the consistencies are higher than a threshold, the labelled results may be determined to be valid for training the AI machine and be fed to the AI machine. Therefore, the AI machine may learn from the labelled results about how to identify future raw data as, for example, a cat or a dog, and accordingly generate an AI model for identifying the future raw data.

In addition, when the labelled results are fed to the AI machine, the labelled results may be assigned with different weightings based the related confidence levels. For example, in FIG. 3, since the confidence levels related to the raw data R01, R03, R05, R06, R08, and R09 are "H" (high), the labelled results related thereto may be assigned with a higher weighting, which makes the AI machine take more considerations thereto. On the other hand, since the confidence levels related to the raw data R02, R04, R07, and R10 are "M" (moderate), the labelled results related thereto may be assigned with a lower weighting, which makes the AI machine take less considerations thereto, but the disclosure is not limited thereto.

In another embodiment, if only a first number of the consistencies are higher than the threshold, it may be determined that only the specific part of the labelled results is valid for training the AI machine. In one embodiment, the specific part may include a specific labelled data set of a specific annotator whose related consistencies are higher than a threshold. For example, if the consistencies related to the annotator A, such as $R_{AB}$, $R_{AC}$, and the intra-consistency of the annotator A, are higher than a threshold, the labelled data set LDS1 may be provided to train the AI machine, but the disclosure is not limited thereto. In addition, when the specific part of the labelled results is fed to the AI machine, the labelled results therein may also be assigned with different weightings based on the confidence levels thereto, which may be referred to the teachings in the above.

In yet another embodiment, if a second number of the consistencies are lower than the threshold, it may be determined that the labelled results are not valid for training the AI machine, and hence step S250 may be subsequently performed to create the notification. The notification may be regarded as a report, which may be shown to, for example, the administrators of the annotators A-C, such that the administrators may be aware of the performances of the annotators, but the disclosure is not limited thereto.

In different embodiments, the notification may include an unqualified annotator whose related consistencies are lower than a threshold. For example, if the consistencies related to the annotator A, such as $R_{AB}$, $R_{AC}$, and the intra-consistency of the annotator A are lower than a threshold, it represents that the performance of the annotator A on labelling the raw data may be unsatisfying, and hence the annotator A may be highlighted in the notification for the administrators to know.

Additionally, or alternatively, the notification may include a questionable raw data which is inconsistently labelled by the annotators. Specifically, sometimes the reason of the annotators failing to achieve acceptable consistencies is because the qualities of the raw data are too poor to be recognized (e.g., blurry images). Therefore, the questionable raw data that are (highly) inconsistently labelled by the annotators may be added to the notification for the administrators to know. After considering the questionable raw data, the administrators may determine whether to discard the questionable raw data. In some other embodiments, the processor 104 may additionally determine the quality of the raw data based on the resolution, signal-to-noise ratio, and/or the contrast thereof and accordingly exclude the raw data with low quality. In one embodiment, if the intra-annotator consistency of a certain annotator is high, the notification may highlight the certain annotator for his/her good work. However, if the intra-annotator consistency of a certain annotator is, the notification may highlight the certain annotator's labelled results for the administrators to decide whether to keep the certain annotator's labelled results, send the certain annotator back to be trained again, and/or check the quality of the raw data.

In other embodiments, even if the notification is generated, the method may further determine that whether there are some of the labelled results that can be used to train the AI machine.

In one embodiment, if only the first inter-annotator consistency (i.e., $R_{AB}$) is higher than a threshold (i.e., the second and the third inter-annotator consistencies are low), a consistently labelled data between the labelled data set LDS1 and the labelled data set LDS2 may be fed to the AI machine. That is, as long as one of the inter-annotator consistencies (e.g., $R_{AB}$) is high enough, the consistently labelled data of the two related annotators (e.g., the annotators A and B) may be still considered as valuable for training the AI machine.

In another embodiment, if only the first inter-annotator consistency and the second inter-annotator consistency related to the annotator A are higher than a threshold, the labelled data set LDS1 may be fed to the AI machine. Specifically, since only the consistencies (e.g., $R_{AB}$ and $R_{AC}$) related to the annotator A are high enough, it represents that the labelled data set LDS1 may have a higher consistency with each of the labelled data sets LDS2 and LDS3. Therefore, the labelled data set LDS1 may be still considered as valuable for training the AI machine. In addition, since the third inter-annotator consistency (i.e., $R_{BC}$) failed to meet the threshold, the notification may be added with another content about the raw data that are inconsistently labelled by the annotators B and C for the administrators to check.

In yet another embodiment, if only the first inter-annotator consistency and the second inter-annotator consistency related to the annotator A are lower than a threshold, the labelled data sets LDS2 and LDS3 may be fed to the AI machine. Specifically, since only the consistencies (e.g., $R_{AB}$ and $R_{AC}$) related to the annotator A are unsatisfying, it represents that the labelled data set LDS1 may have a lower consistency with each of the labelled data sets LDS2 and LDS3. Therefore, the labelled data sets LDS2 and LDS3 may be still considered as valuable for training the AI machine. In addition, since the notification may be added with another content about the labelled data set LDS1 of the annotator A, whose works are highly inconsistent with other annotators, for the administrators to check.

In other embodiments, the consistencies mentioned FIG. 2 may be defined in other ways, which may lead to different implementations of step S230. Detailed discussions would be provided hereinafter, and FIG. 3 would be regarded as an example for better understandings.

For each of the raw data R01-R10 of FIG. 3, each of the annotators A-C may choose one of a plurality of object categories therefor. As taught in the previous embodiments, the considered object categories may include "C" and "D". Taking the raw data R01 as an example, the annotators A-C may respectively choose C, C, C for the raw data R01, and hence the labelled data LD011, LD012 and LD013 may be accordingly generated and collectively form the labelled result LR01. Taking the raw data R10 as another example, the annotators A-C may respectively choose D, C, C for the raw data R10, and hence the labelled data LD101, LD102 and LD103 may be accordingly generated and collectively form the labelled result LR10.

Roughly speaking, the processor 104 may determine a consistency score for each of the raw data R01-R10 based on the labelled results in FIG. 3, and accordingly determine whether the raw data R01-R10 are valid for training the AI machine. For ease of understanding, the labelled result LR02 and the related labelled data LD021, LD022 and LD023 would be used as an example for the following discussions, but the disclosure is not limited thereto.

In one embodiment, the processor 104 may generate a recommend result for the labelled result LR02 by comparing the labelled data LD021, LD022 and LD023 in the labelled result LR 02 of the annotators A-C. For example, the processor 104 may determine a specific object category of the object categories as the recommend result, wherein the specific object category has a highest number in the labelled data LD021, LD022 and LD023. In the labelled result LR02, the number of the object category "C" is 1, and the number of the object category "D" is 2. Accordingly, the processor 104 may take the object category "D" with the highest number as the recommend result. In some embodiments, the recommend result may be some deterministic answers that is pre-given for being used to compared with the labelled data, but the disclosure is not limited thereto.

Afterwards, the processor 104 may determine a first consistency score of each annotator A-C on the labelled result LR02 by comparing each labelled data LD021, LD022 and LD023 with the recommend result (e.g., "D"). In one embodiment, the processor 104 may determine whether the labelled data LD021 of the annotator A is identical to the recommend result. In FIG. 3, since the labelled data LD021 is different from the recommend result, the processor 104 may determine the first consistency score of the annotator A is 0. In one embodiment, the processor 104 may determine whether the labelled data LD022 of the annotator B is identical to the recommend result. In FIG. 3, since the labelled data LD022 is identical to the recommend result, the processor 104 may determine the first consistency score of the annotator B is 1. Similarly, the processor 104 may determine the first consistency score of the annotator C is 1. In other embodiments, the first consistency score of each annotators A-C may also be obtained in other ways based on the requirements of the designers.

Next, the processor 104 may determine a second consistency score of the labelled result LR02 based on the first consistency score of each annotator A-C. In one embodiment, the processor 104 may determine an average of the first consistency score of each annotator A-C as the second consistency score. In FIG. 3, since the first consistency scores of the annotators A-C are 0, 1, and 1, the second consistency score of the labelled result LR02 may be calculated as 0.66 (i.e., (0+1+1)/3=0.66), but the disclosure is not limited thereto.

Subsequently, the processor 104 may determine whether the second consistency score of the labelled result LR02 is higher than a consistency score threshold. If yes, the processor 104 may determine that the labelled result LR02 is valid for training the artificial intelligence machine, and vice versa.

In other embodiments, the disclosure further proposes a mechanism for determining whether an annotator is reliable for performing the labelling tasks or the labelled data labelled by the annotator in the labelled results is valid for training the artificial intelligence machine. For ease of understanding, the annotator A would be used as an example, but the disclosure is not limited thereto.

Specifically, the processor 104 may determine a recommend result for each of the labelled results. Taking FIG. 3 as an example, the recommend result of the labelled results corresponding to the raw data R01-R10 are C, D, D, D, D, D, D, C, C, C. The detail of obtaining the recommend result of each labelled result may be referred to the previous teachings, which would not be repeated herein.

Next, the processor 104 may determine the first consistency score of the annotator A on each of the labelled results by comparing the labelled data (labelled by the annotator A in each labelled result) and the recommend result of each labelled results. Based on the teaching in the above, the first consistency scores of the annotator A on the labelled results are 1, 0, 1, 1, 1, 1, 1, 1, 1, 0.

Afterwards, the processor 104 may determining a third consistency score of the annotator A based on the first consistency score of the annotator A on each of the labelled results. In one embodiment, the processor 104 may take an average of the first consistency score of the annotator A on each of the labelled results as the third consistency score, which may be 0.8 (i.e., (1+0+1+1+1+1+1+1+1+0)/10=0.8).

With the third consistency score of the third consistency score of the annotator A on each of the labelled results, the processor 104 may determine whether the third consistency score of the annotator A on each of the labelled results is higher than an annotator score threshold. If yes, the processor 104 may determine that the annotator A is reliable for labelling the raw data, and vice versa.

In other embodiments, the processor 104 may calculate a fourth consistency score of the dataset that includes the labelled results of FIG. 3. Specifically, based on the teachings in the above, the second consistency score of the labelled results corresponding to the raw data R01-R10 are 1, 0.66, 1, 0.66, 1, 1, 0.66, 1, 1, 0.66. In this case, the processor 104 may determine an average of the second consistency score of the labelled results corresponding to the raw data R01-R10 as the fourth consistency score of the dataset of FIG. 3. Therefore, the fourth consistency score of the dataset would be 0.86 (i.e., (1+0.66+1+0.66+1+1+0.66+1+1+0.66)/10=0.86). With the fourth consistency score, the processor 104 may determine whether the dataset as a whole is qualified for training by determine whether the fourth consistency score is higher than a consistency score threshold. If yes, the processor 104 may determine that the dataset is qualified for training, and vice versa, but the disclosure is not limited thereto.

As can be known from the above, the method of the disclosure may determine whether the labelled results of the annotators are valid to train the AI machine based on the consistencies (e.g., the inter-annotator consistency or/and the intra-annotator consistency) of the annotators. Further, if there exist questionable raw data, unqualified annotators, or like, a notification may be accordingly created and provided to the administrators. As such, the administrators may be aware of the performances of the annotators and the quality of the raw data and correspondingly take actions, such as excluding the questionable raw data and the unqualified annotators (even the label data made by the unqualified annotators will not be saved as the training data for the AI machine). Moreover, when the labelled results are fed to the AI machine, the labelled results may be assigned with different weightings based the related confidence levels, such that the AI machine may decide to learn more from which of the labelled results (i.e., the labelled results with higher confidence levels).

In some other embodiments, the concept described in the above may be used to verify whether the annotators are qualified (or well-trained) to label raw data. See FIG. 6 and FIG. 7 for further discussions.

Figure 6:
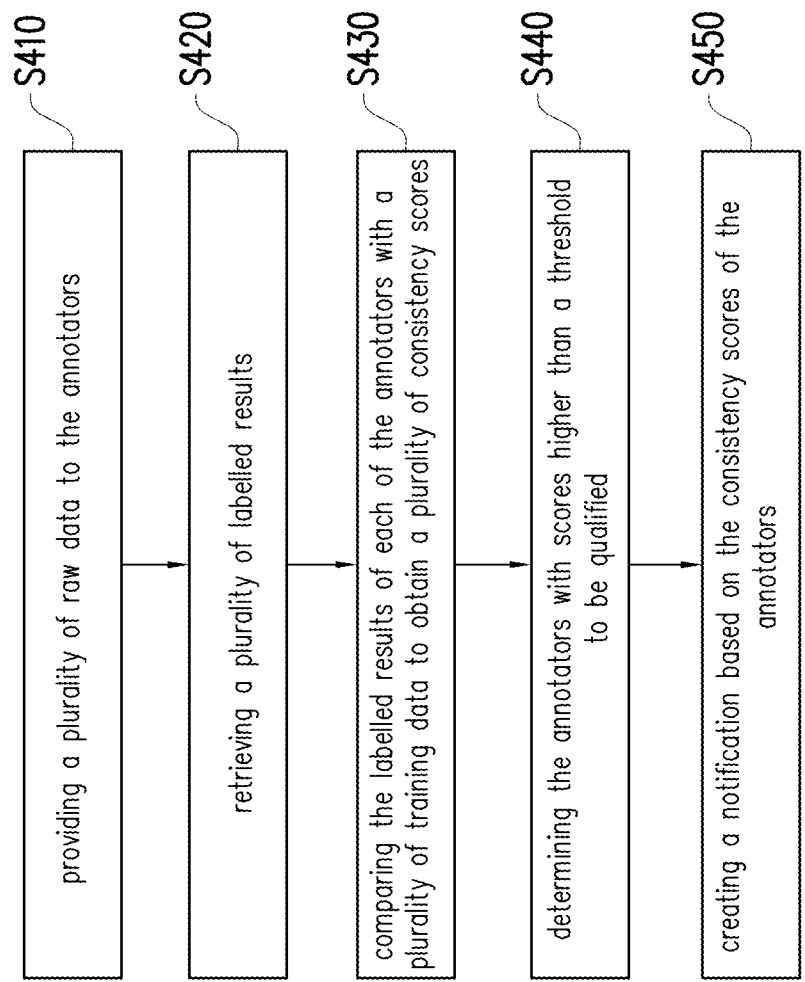
FIG. 6 is a flow chart of the method for verifying the annotators according to an exemplary embodiment of the disclosure.

FIG. 6 is a flow chart of the method for verifying the annotators according to an exemplary embodiment of the disclosure, and FIG. 7 is a schematic view of comparing the labelled results of the annotators with correct answers according to an embodiment of the disclosure. The method shown in FIG. 6 may be implemented by the training system 100 of FIG. 1A. The details of each step of FIG. 6 will be described below with reference to the elements shown in FIG. 1A and the scenario shown in FIG. 7.

In step S410, a plurality of raw data R01', R02', ..., R09', and R10' may be provided to annotators B and C. In the present embodiment, each of the raw data R01'-R10' may be an image of a cat or a dog for the annotators B and C to identify, but the disclosure is not limited thereto. In other embodiments, the raw data may include other types of images, such as human images, medical images, etc.

For example, when the raw data R01' is presented to the annotator B, the annotator B may recognize the raw data R01' as an image with a cat, and hence the annotator B may use "C" (which may be regarded as a labelled data LD012') to label the raw data R01'. For the annotator C, since the annotator C may also recognize the raw data R01' as an image with a cat, and hence the annotator C may also use "C" (which may be regarded as labelled data LD013') to label the raw data R01'.

For the ease of the following discussions, the labelled data of the annotators on the same raw data will be collectively referred as a labelled result, and the labelled data of one annotator on all of the raw data would be collectively referred as a labelled data set.

Under this situation, the labelled data LD012' and LD013' of the annotators B and C on the raw data R01' may be collectively referred as a labelled result LR01', and the labelled data LD102' and LD103' of the annotators B and C on the raw data R10' may be collectively referred as a labelled result LR10'. The labelled data made by the annotator B on the raw data R01'-R10' may be referred as a labelled data set LDS2', and the labelled data made by the annotator C on the raw data R01'-R10' may be referred as a labelled data set LDS3', but the disclosure is not limited thereto.

In step S420, a plurality of labelled results may be retrieved. In the present embodiment, the labelled results of the annotators B and C on labelling the raw data R01'-R10', such as the labelled results LR01' and LR10', may be retrieved after the annotators B and C finish their labelling tasks on the raw data R01'-R10'.

In step S430, the labelled results of each of the annotators may be compared with a plurality of training data to obtain a plurality of consistency scores. In FIG. 7, the training data may be characterized as the correct answers of labelling the raw data R01'-R10'. That is, each of the raw data R01'-R10' will be pre-labelled as a cat or a dog by, for example, the administrators of the annotator B and C. For the annotator B, since there are 6 of the labelled data in the labelled data set LDS2' are consistent with the correct answers, the consistency score of the annotator B may be 0.6 (i.e., 6/10). For the annotator C, since there are 8 of the labelled data in the labelled data set LDS3' are consistent with the correct answers, the consistency score of the annotator C may be 0.8 (i.e., 8/10).

In other embodiments, if the annotators B and C are asked to label the raw data in different ways, such as labelling an ROI in each of the raw data, the way of obtaining/calculating the consistency scores may be correspondingly modified. For example, if the annotator B is asked to label the region of a tumor in a CT image, the consistency score of the annotator B may be characterized by the similarities between the ROI labelled by the annotator B and the ROI (i.e., the training data or the correct answer) pre-labelled by the administrators in each of the raw data. In various embodiments, these similarities may be obtained by algorithms such as Dice similarity indices/Jaccard index method, Cohen's Kappa method, Fleiss' Kappa method, Krippendorff's alpha method, and/or the intraclass correlation coefficient method, but the disclosure is not limited thereto.

In step S440, the annotators with consistency scores higher than a threshold may be determined to be qualified, and in step S450 a notification may be created based on the consistency scores of the annotators. For example, if the annotator B is determined to be qualified, it may represent that the performance of the annotator B is good enough to label other unknown raw data. Therefore, the annotator B can be, for example, dispatched to do the works discussed in the embodiments of FIG. 2 and FIG. 3, but the disclosure is not limited thereto.

On the other hand, if the consistency score of the annotator B fails to meet the threshold, it may represent that the performance of the annotator B is not good enough to label other unknown raw data. Therefore, the annotator B can be highlighted in the notification for the administrators to know, and the administrators may take actions such as asking the annotator B to be trained with specific training sessions related to enhance the skills of labelling the raw data, such as medical trainings for identifying a tumor in a CT image, but the disclosure is not limited thereto.

In one embodiment, those questionable raw data that are highly incorrectly answered by the annotators B and C may also be highlighted in the notification for the administrators to know that which of the raw data may be too difficult to be identified. Therefore, the administrators may accordingly decide whether to exclude the questionable raw data from the raw data used to verify other annotators. In some other embodiments, the questionable data may be automatically excluded by the processor 104 based on some specific criteria.

In some other embodiments, before the annotators B and C perform the labelling tasks on the raw data, the annotators B and C may be asked to participate the specific training sessions related to enhance the skills of labelling the raw data, such as medical trainings for identifying a tumor in a CT image. If some of the annotators are determined to be unqualified, the administrators may correspondingly modify the contents of the training sessions and ask theses annotators to take the modified training sessions again, but the disclosure is not limited thereto.

As can be known from the above, the method of the disclosure may verify whether the annotators are qualified to label other unknown raw data based on the comparison result between their labelled results and the training data (e.g., the correct answers). Further, the method may create notification based on the consistency scores of the annotators, such that the administrators may be aware of questionable raw data, unqualified annotators, or the like and correspondingly take actions such as modifying training sessions, excluding questionable raw data, and asking unqualified annotators to take training sessions again, etc.

Figure 8:
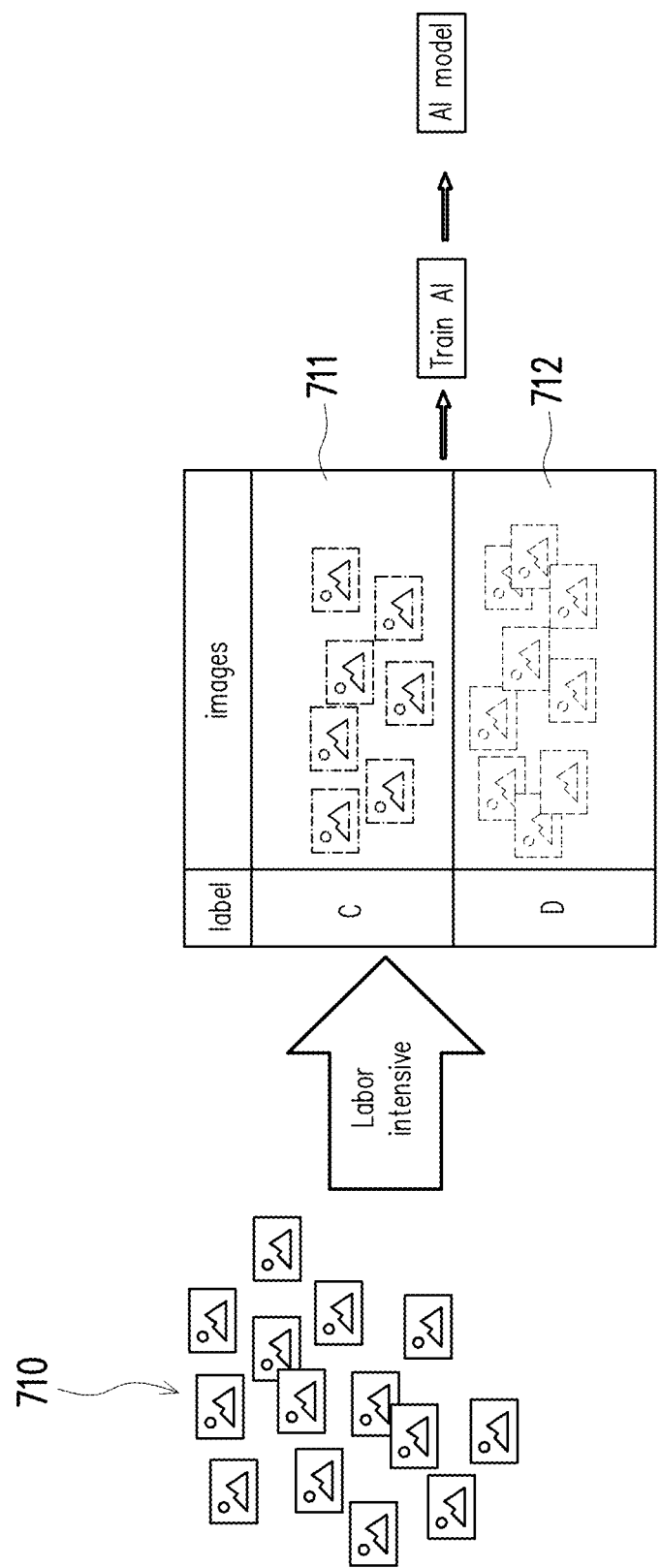
FIG. 8 shows a conventional way of labelling the data for training AI machines to generate the AI model.

See FIG. 8, which shows a conventional way of labelling the data for training AI machines to generate the AI model. As shown in FIG. 8, if raw data 710 include data belonging to a first class data set (e.g., an image of a cat) or a second class data set (e.g., an image of a dog), each of the raw data 710 has to be manually labelled by users as "C" (i.e., cat) or "D" (i.e., dog), which is a labor intensive work for the users. After all of the raw data 710 are labelled, the labelled data 711 which are labelled as "C" and the labelled data 712 which are labelled as "D" may be used to train the AI machine to generate the AI model.

However, as the number of the raw data 710 grows, more and more effort of the users have to be given to label the raw data 710, which makes the labelling tasks inefficient.

Accordingly, the disclosure proposes a method for labelling raw data based on pre-labelled data, which may use a plurality of the pre-labelled data to train the AI machine and use the correspondingly generated AI model to assist the work of labelling the remaining raw data. See FIG. 9, FIG. 10A, and FIG. 10B for detailed discussions.

Figure 9:
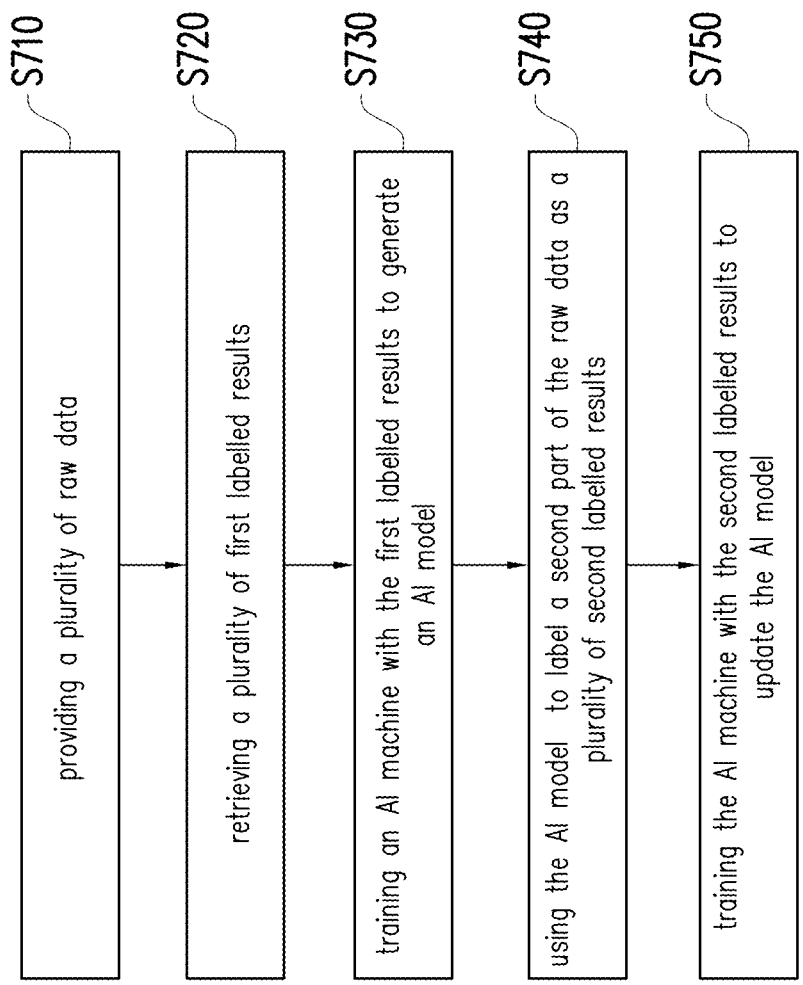
FIG. 9 is a flow chart of the method for labelling raw data based on pre-labelled data according to one embodiment of the disclosure.
Figure 10A:
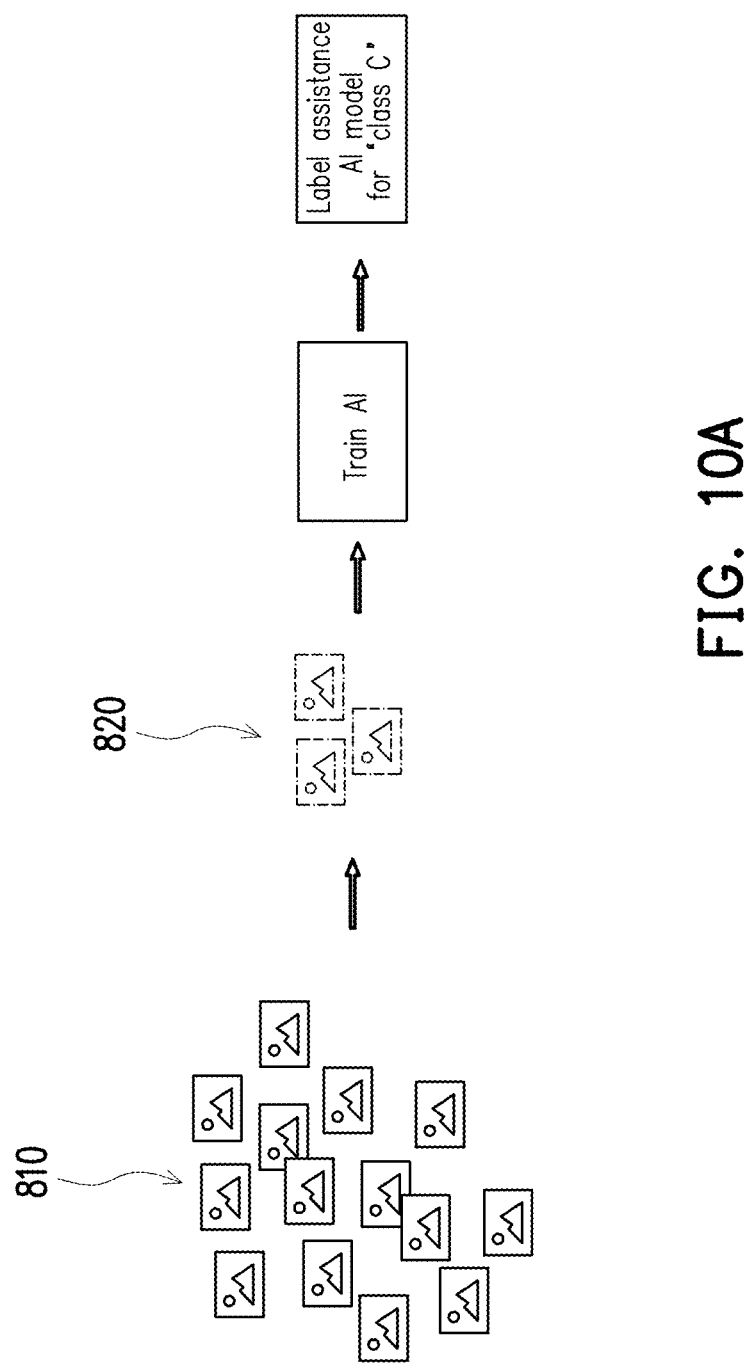
FIG. 10A and FIG. 10B are schematic views of implementing the method of FIG. 9.
Figure 10B:
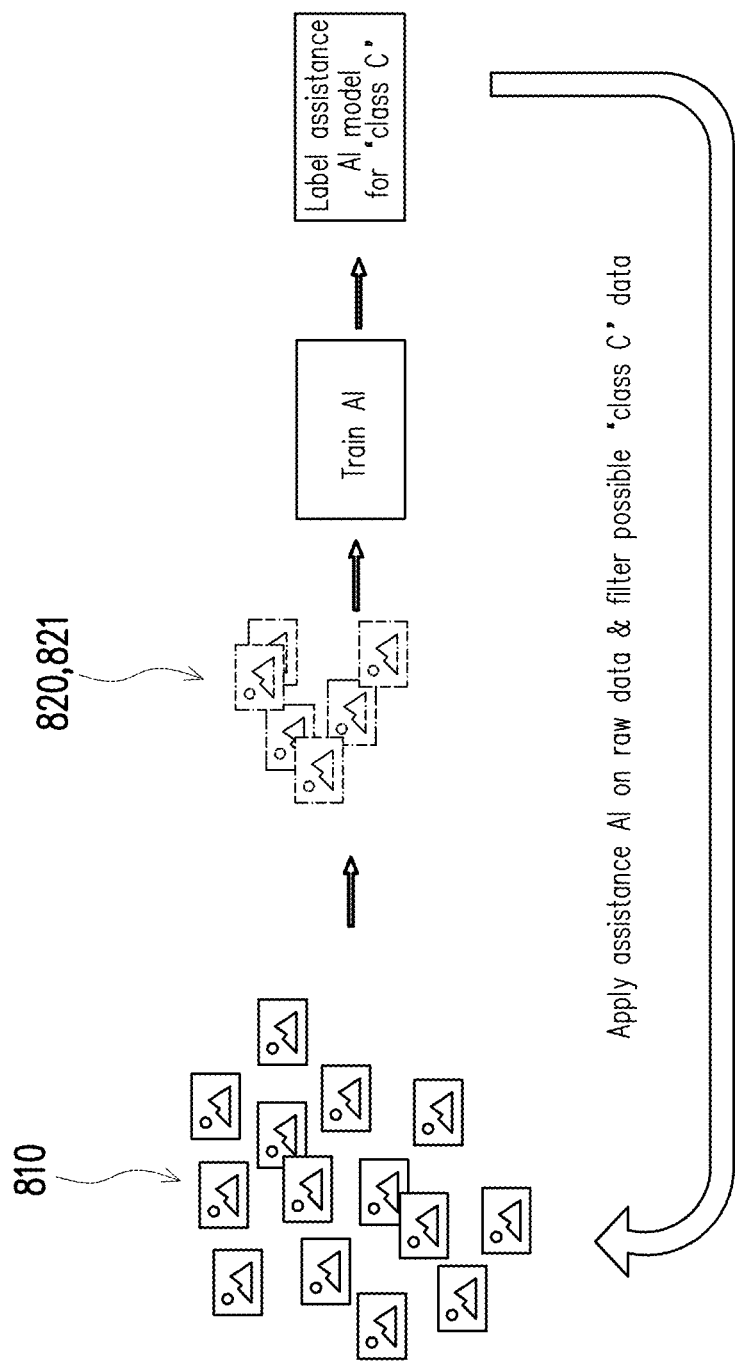

FIG. 9 is a flow chart of the method for labelling raw data based on pre-labelled data according to one embodiment of the disclosure, and FIG. 10A and FIG. 10B are schematic views of implementing the method of FIG. 9. The method shown in FIG. 9 may be implemented by the training system 100 of FIG. 1A. The details of each step of FIG. 9 will be described below with reference to the elements shown in FIG. 1A and the scenario shown in FIGS. 10A and 10B.

In step S710, a plurality of raw data 810 may be provided. In the present embodiment, the raw data 810 are assumed to be formed by data belonging to a first class data set or a second class data set. For the ease of following discussions, the data belonging to the first class data set are assumed to be images of cats (class "C"), and the data belonging to the second class data set are assumed to be images of dogs (class "D"), but the disclosure is not limited thereto.

In step S720, a plurality of first labelled results 820 may be retrieved. In the present embodiment, the first labelled results 820 may be the pre-labelled data made by, for example, professionals or the annotators on labelling ROIs in a first part of the raw data 810. For example, the annotators may be asked to label a small batch of the raw data 810 that may be regarded as belonging to the first class data set. That is, the first labelled results 820 may be the images labelled by the annotators as images of cats.

In step S730, an AI machine may be trained with the first labelled results 820 to generate an AI model. In the present embodiment, since the AI machine is trained with the first labelled results 820, which are the images belonging to the class "C", the AI machine may learn whether to identify unknown images as class "C". In this case, the correspondingly generated AI model may determine whether to identify unknown images as class "C" in response to receiving the unknown images, but the disclosure is not limited thereto.

In step S740, the AI model may be used to label a second part of the raw data 810 as a plurality of second results 821, as shown in FIG. 10B. That is, after the AI machine has been trained with the first labelled results 820 to generate the AI model, and the AI model may be used to assist the tasks on labelling the second part of the raw data 810 as the second labelled results 821. Therefore, the data that can be used to train the AI machine to identify the images of the class "C" may be increased.

In step S750, the AI machine may be trained with the second labelled results 821 to update the AI model. That is, since the data that can be used to train the AI machine to identify the images of the class "C" are used to further train the AI machine, the updated AI model may better learn whether to identify unknown images as class "C". In some embodiments, before the second labelled results 821 are used to train the AI machine, the second labelled results 821 may be double checked by the annotators, but the disclosure is not limited thereto.

In other embodiments, the updated AI model may be further used to label a third part of the raw data 810 as a plurality of third labelled results, and the AI machine may be further trained with the third labelled results to further update the AI model. Further, the updated AI model may be used to assist the tasks on labelling other parts of the raw data 810 as the class "C". The steps in the above can be repeatedly performed until all of the class "C" data in the raw data 810 have been completely labelled, but the disclosure is not limited thereto.

As a result, the whole tasks on labelling the class "C" data in the raw data 810 may be less labor intensive and more efficient.

In other embodiments, after all of the class "C" data (i.e., the data belonging to the data set) are identified by the AI model, a plurality of fourth labelled results may be retrieved. In the present embodiment, the fourth labelled results may be the pre-labelled data made by, for example, professionals or the annotators on labelling ROIs in a fourth part of the raw data 810. For example, the annotators may be asked to label a small batch of the raw data 810 that may be regarded as belonging to the second class data set, i.e., the class "D" data. That is, the fourth labelled results may be the images labelled by the annotators as images of dogs.

Next, the AI machine may be trained with the fourth labelled results to update the AI model. In the present embodiment, since the AI machine is trained with the fourth labelled results, which are the images belonging to the class "D", the AI machine may learn whether to identify unknown images as class "D". In this case, the correspondingly generated AI model may determine whether to identify unknown images as class "D" in response to receiving the unknown images, but the disclosure is not limited thereto.

Similar to the above teachings, the AI model may be used to label a fifth part of the raw data as a plurality of fifth labelled results, wherein the fifth labelled results are identified by the artificial model to be categorized as the second class data set, i.e., the class "D" data. Afterwards, the AI machine may be further trained with the fifth labelled results to update the AI model. The steps in the above can be repeatedly performed until all of the class "D" data in the raw data 810 have been completely labelled, but the disclosure is not limited thereto.

In one embodiment, after all of the raw data 810 have been labelled and used to train the AI machine, the AI model to identify an unknown data as belonging to the first class data set (i.e., a class "C" data) or the second class data set (i.e., a class "D" data).

In other embodiments, if the raw data 810 includes other class data set, the concept introduced in the above may be used to train the AI model to assist the tasks on labelling the raw data 810. In this case, the generated AI model may be further used to identify an unknown data as belonging to the first class data set (i.e., a class "C" data), the second class data set (i.e., a class "D" data), or other class data set, but the disclosure is not limited thereto.

Consequently, the whole tasks on labelling the class "C" data, the class "D" data in the raw data 810 may be less labor intensive and more efficient.

In other embodiments, the mechanism of the training system 100 determining whether the labelled results are valid for training an artificial intelligence machine based on a plurality of consistencies of the annotators in step S230 can be implemented in other ways, and the related details would be provided hereinafter.

Specifically, as mentioned in the above, as the annotators are provided with a raw data, the annotators may be asked to label ROIs (e.g., a tumor) in the raw data. In the following discussions, each of the raw data provided by the processor 104 to the annotators may include one or more target object for the annotators to label, and each target object may belong to one of object categories. For example, a raw data may be an image that includes target objects such as a cat and a dog, wherein the cat and the dog belong to different categories. As the processor 104 provides the annotators with the raw data, the annotators may label the raw data by, for example, labelling bounding regions with a tag in the raw data to label the target objects. The bounding regions with tags labelled in the raw data may be referred to as labelled data, and the raw data with labelled data may be referred to as a labelled result. In various embodiments, the tag of each bounding regions may indicate the chosen category. For example, after the annotator labels a bounding region in the image, the annotator may choose one of the object categories as the tag (e.g., cat or dog) of the bounding region to specify which of the object categories corresponds to the labelled bounding region.

Figure 11:
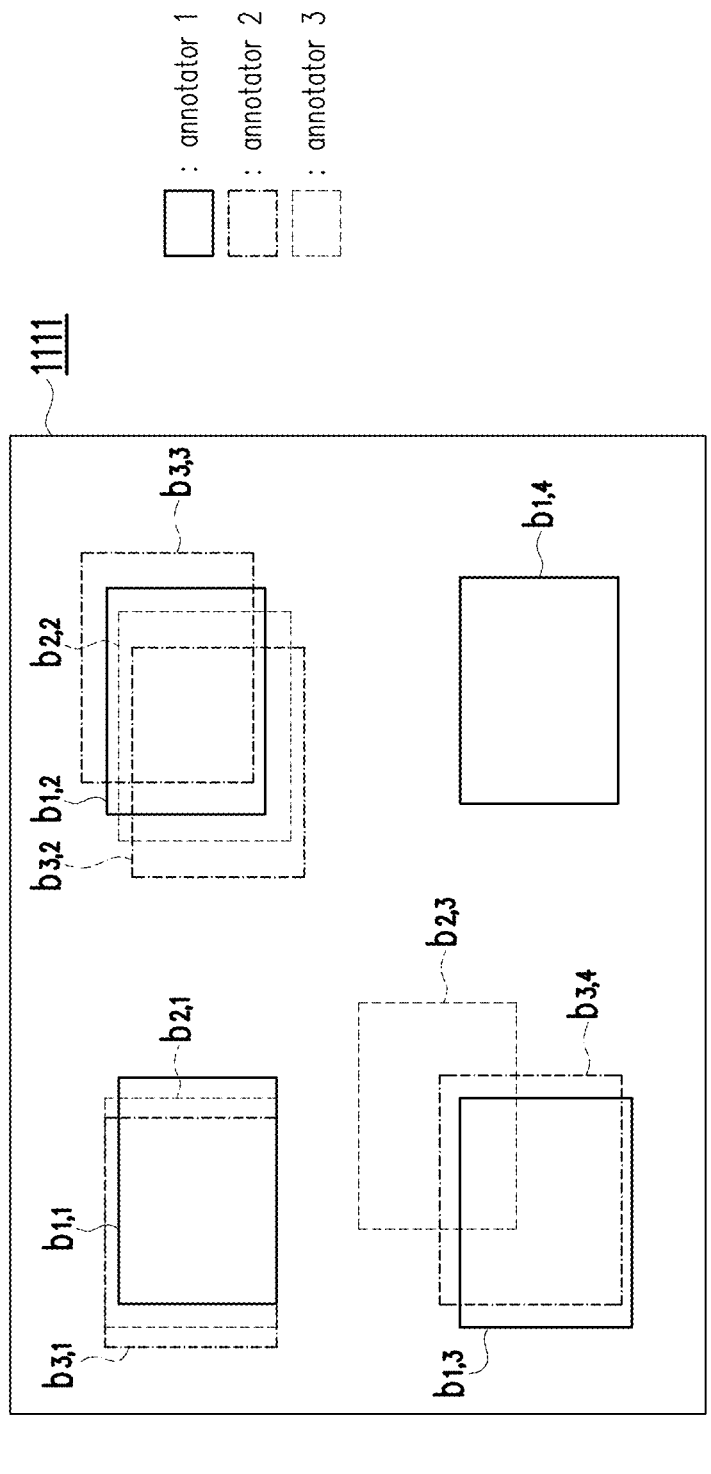
FIG. 11 illustrates a labelled result according to an embodiment of the disclosure.

See FIG. 11, which illustrates a labelled result according to an embodiment of the disclosure. In the scenario of FIG. 11, a first raw data 1111 may be provided by the processor 104 to three annotators 1, 2, and 3 to label. In the embodiment, the first raw data 1111 is assumed to be an image that only includes target objects (e.g., dogs) of one object category for ease of discussions, but the disclosure is not limited thereto. In other embodiments, the first raw data may be an image that includes multiple target objects belonging to various object categories.

With the first raw data 1111, the annotators 1, 2, and 3 may, for example, draw bounding regions to label the target object therein. In FIG. 11, a bounding region $b_{i,j}$ represents that it is the j-th bounding region labelled by the annotator i. For example, the bounding region $b_{1,1}$ is the first bounding region labelled by the annotator 1, the bounding region $b_{2,1}$ is the first bounding region labelled by the annotator 2, and the bounding region $b_{3,2}$ is the second bounding region labelled by the annotator 3, etc.

Noted that each annotator performs their labelling operation individually without seeing to others' labelling operations, and FIG. 11 integrally shows all of the bounding regions of the annotators for visual aid.

After the annotators 1, 2, and 3 finish their labelling operations, the first raw data with the shown bounding regions (i.e., labelled data) may be referred to as a first labelled result 1110 and retrieved by the processor 104. With the first labelled result 1110, the processor 104 may accordingly determine whether the first labelled result 1110 is valid for training an AI machine based on a plurality of consistencies of the annotators (For example, whether the labelled data of the annotators 1, 2, and 3 corresponding to the first labelled result 1110 should be used as the training data for training AI machine).

Figure 12:
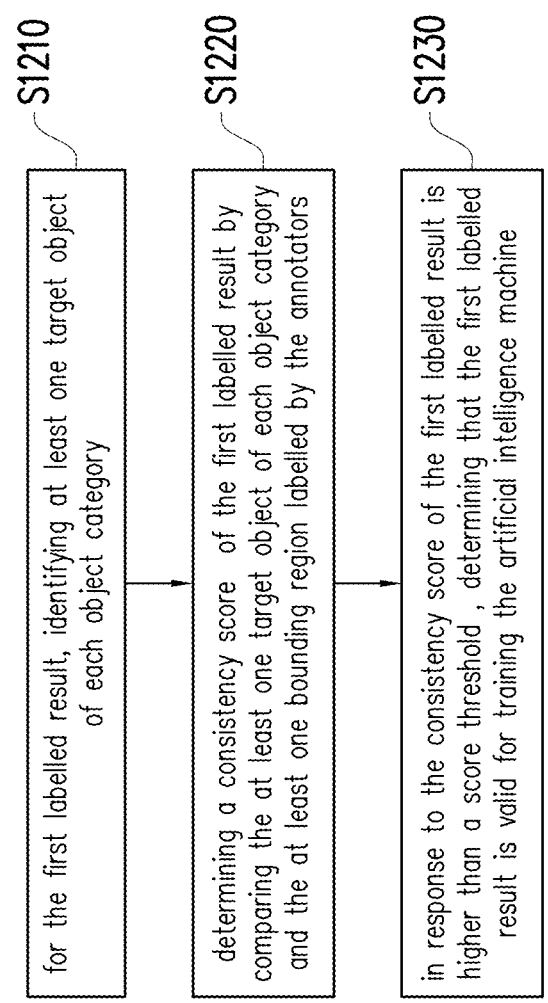
FIG. 12 shows a mechanism of determining whether the first labelled result is valid for training an AI machine.

See FIG. 12, which shows a mechanism of determining whether the first labelled result is valid for training an AI machine. In step S1210, for the first labelled result 1110, the processor 104 may identify at least one target object of each object category, wherein each target object is commonly labelled by at least two of the annotators.

Specifically, the processor 104 may determine a plurality of region pairs, wherein each region pair includes a pair of bounding regions labelled by different annotators. Taking FIG. 13A as an example, which shows the bounding regions labelled by two of the annotators according to FIG. 11.

Figure 13A:
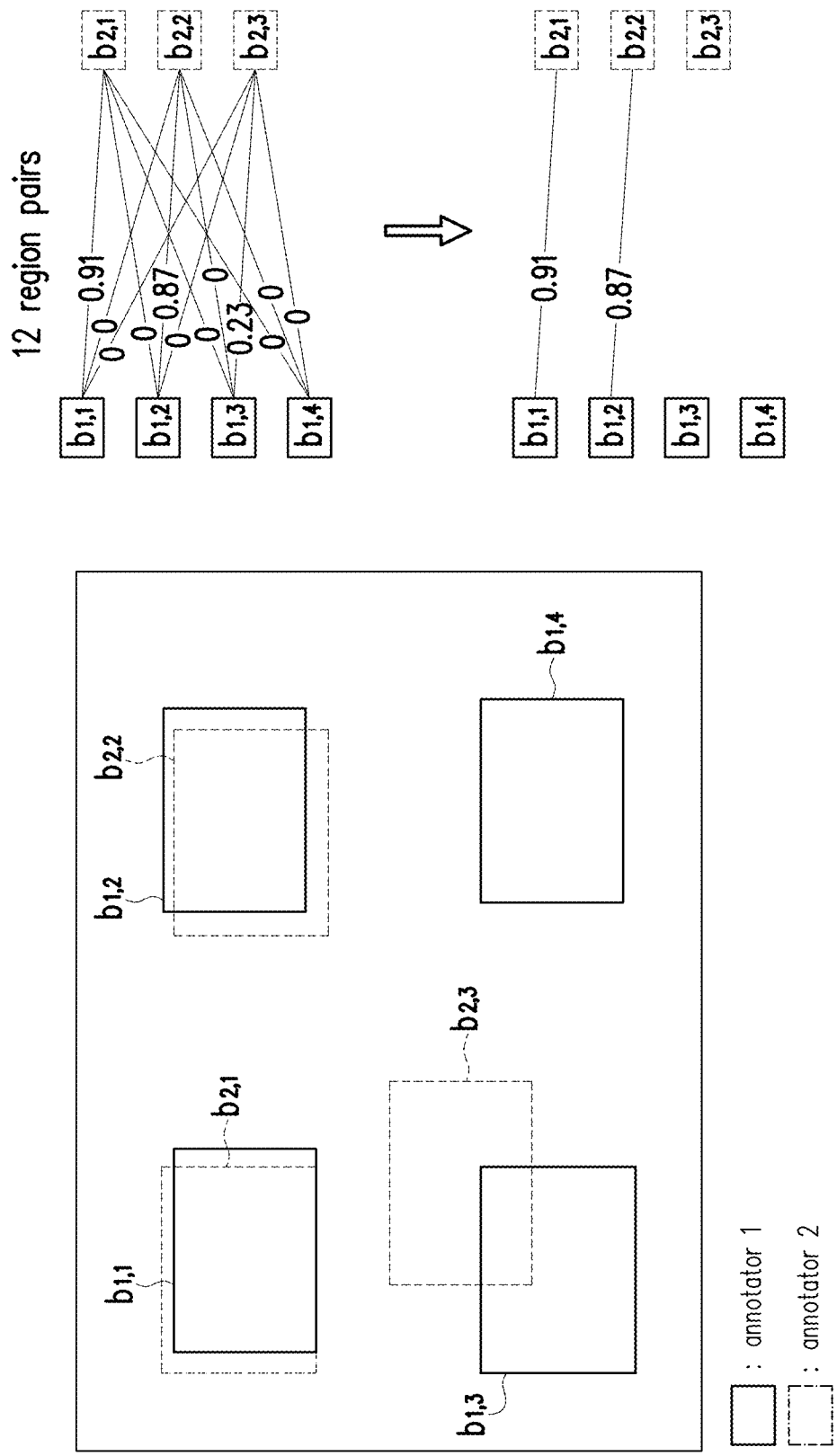
FIG. 13A shows the bounding regions labelled by two of the annotators according to FIG. 11.

In FIG. 13A, there are four bounding regions $b_{1,1}$-$b_{1,4}$ of the annotator 1 and three bounding regions $b_{2,1}$-$b_{2,3}$ of the annotator 2. In this case, the processor 104 may accordingly determine 12 region pairs between the annotator 1 and 2, and each of the region pairs includes one of the bounding regions of the annotator 1 and one of the bounding regions of the annotator 2. For example, one of the region pairs between the annotator 1 and 2 may be formed by the bounding regions $b_{1,1}$ and $b_{2,1}$. Based on the same principle, the processor 104 may determine the region pairs between the annotator 2 and 3 and determine the region pairs between the annotator 1 and 3.

After all of the region pairs between any two of the annotators 1, 2, and 3 are determined, the processor 104 may determine a plurality of correlation coefficients that respectively corresponds to the region pairs, wherein each correlation coefficients characterizes a similarity of one of the region pairs, and the similarity may be obtained based on the principle of IoU, which has been taught in FIG. 5 and would not be repeated herein.

Take the region pair formed by bounding regions $b_{1,1}$ and $b_{2,1}$ as an example. The correlation coefficient of this region pair may be characterized by the similarity between the bounding regions $b_{1,1}$ and $b_{2,1}$. In this embodiment, the similarity between the bounding regions $b_{1,1}$ and $b_{2,1}$ may be obtained based on the mechanism taught in the descriptions related to FIG. 5. That is, the similarity may be obtained by dividing the intersection of the bounding regions $b_{1,1}$ and $b_{2,1}$ with the union of the bounding regions $b_{1,1}$ and $b_{2,1}$, but the disclosure is not limited thereto. Based on the same principle, the correlation coefficients of other region pairs between any two of the annotators 1, 2, and 3 may be accordingly determined.

As exemplarily shown in FIG. 13A, the correlation coefficients of the region pairs between the annotators 1 and 2 may be determined. For improving the subsequent operations for identifying target objects, those region pairs whose correlation coefficients are lower than a correlation threshold would be discarded or ignored. In FIG. 13A, the correlation threshold may be assumed to be 0.5 or the other value 0.3, the disclosure is not limited thereto. Accordingly, there are only two region pairs left in FIG. 13A, wherein one with the correlation coefficient of 0.91 includes the bounding regions $b_{1,1}$ and $b_{2,1}$, and the other with the correlation coefficient of 0.87 includes the bounding regions $b_{1,2}$ and $b_{2,2}$.

For the region pairs between the annotators 2 and 3 and the region pairs between the annotators 1 and 3, the processor 104 may perform similar operations to find out those region pairs whose correlation coefficients are higher than the correlation threshold. The related result may be referred to FIG. 13B, which shows all of the region pairs whose correlation coefficients are higher than the correlation threshold according to FIG. 11 and FIG. 13A.

Figure 13B:
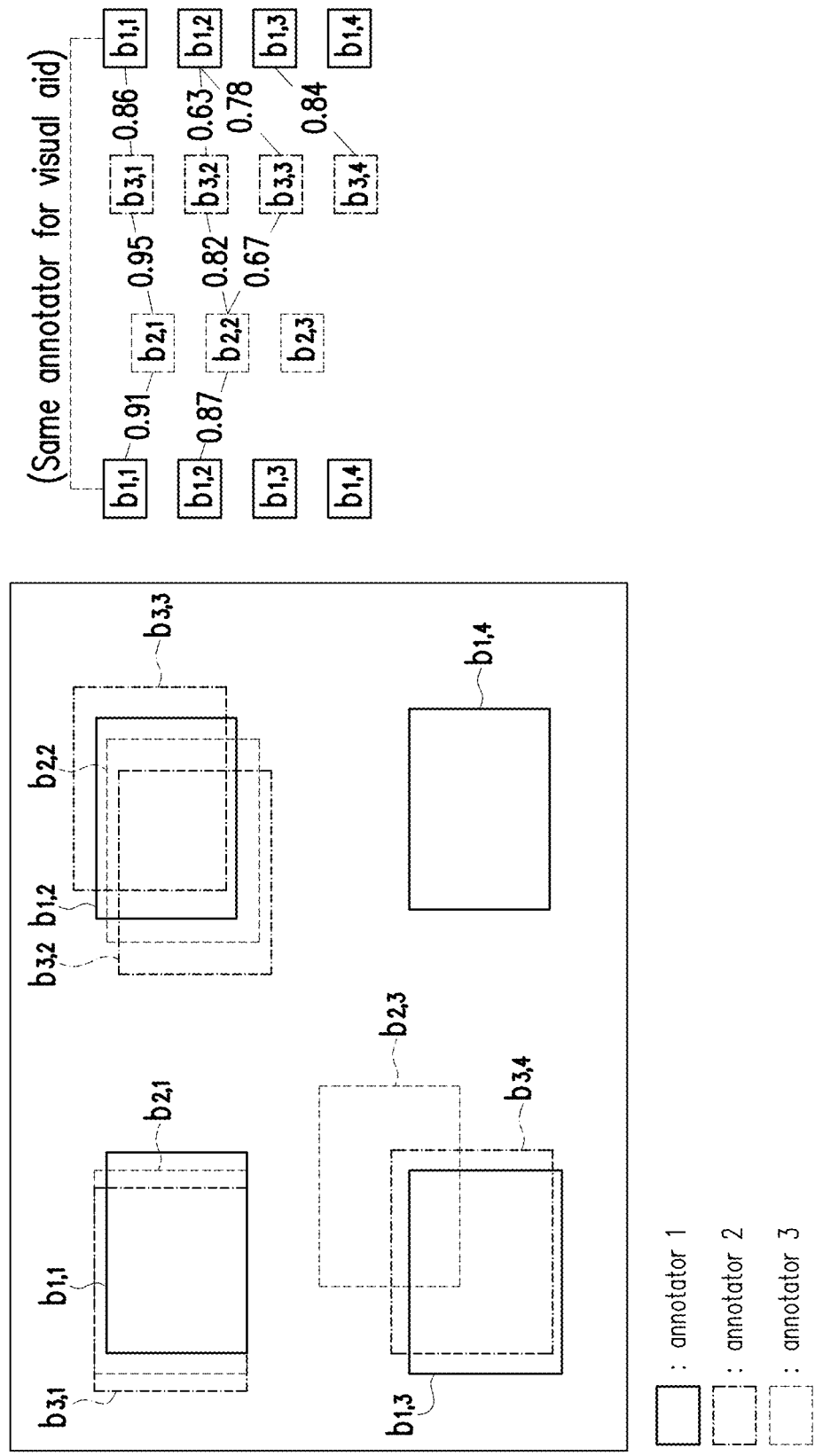
FIG. 13B shows all of the region pairs whose correlation coefficients are higher than the correlation threshold according to FIG. 11 and FIG. 13A.

Based on the exemplary result in FIG. 13B, the processor 104 may merge the bounding regions of the annotators 1, 2, and 3 into a plurality of groups based on the correlation coefficients that are higher than a correlation threshold, wherein each group includes at least two bounding regions from different annotators.

See FIG. 13C, which show the mechanism of merging the bounding regions into the groups. In the present embodiment, the mechanism of the processor 104 merging the bounding regions into the groups may include the following steps: (a) retrieving a specific correlation coefficient, wherein the specific correlation coefficient is highest among the correlation coefficients that are higher than the correlation threshold (step S1310); (b) retrieving a specific region pair corresponding to the specific correlation coefficient from the region pairs, wherein the specific region pair comprises a first specific region and a second specific region (step S1320); (c) determining whether one of the first specific region and the second specific region belongs to an existing group (step S1330); (d) in response to determining that neither of the first specific region or the second specific region belongs to the existing group, creating a new group based on the first specific region and the second specific region (step S1340); (e) in response to determining that one of the first specific region and the second specific region belongs to the existing group, determining whether another of the first specific region and the second specific region corresponds to the same annotator with a member of the existing group (step S1350); (f) in response to determining that the another of the first specific region and the second specific region does not correspond to the same annotator with the member of the existing group, adding the another of the first specific region and the second specific region into the existing group (step S1360); (g) excluding the specific correlation coefficient from the correlation coefficients and excluding the specific region pair from the region pairs (step S1380); and (h) in step S1390, in response to determining that the region pairs are not empty, returning to step S1310. In other embodiments, in response to the determination is "yes" in step S1350, the specific region pair may be neglected (step S1370).

Figure 13D:
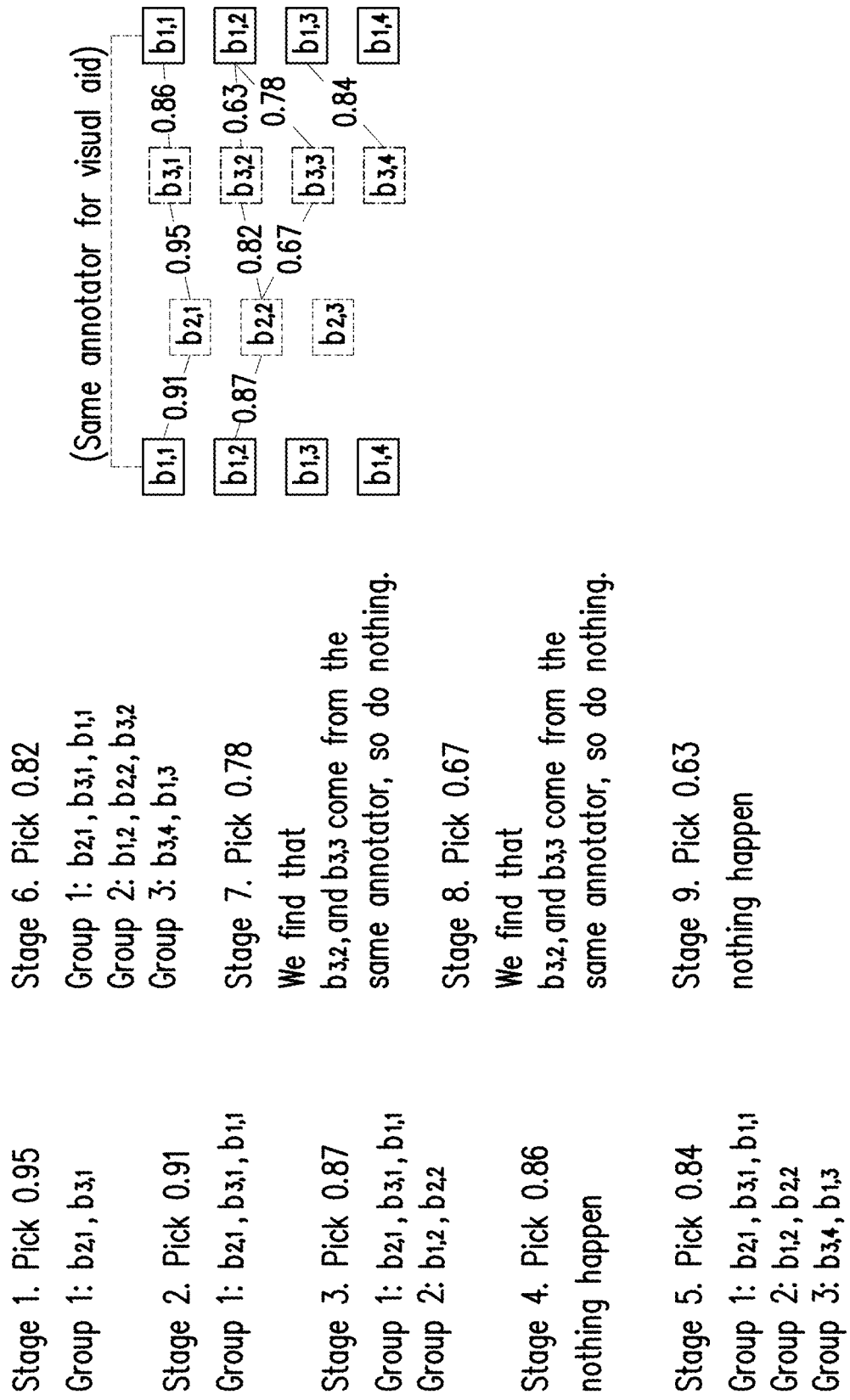
FIG. 13D shows the mechanism of merging the bounding regions into the groups according to FIG. 13B.

The mechanism in the above would be further discussed with FIG. 13D, which shows the mechanism of merging the bounding regions into the groups according to FIG. 13B. Firstly, Stage 1 where no group exists, the processor 104 may retrieve the highest correlation coefficient 0.95 as the specific correlation coefficient (step S1310) and the related specific region pair (step S1320), which includes the bounding regions $b_{2,1}$ and $b_{3,1}$ (i.e., the first specific bounding region and the second specific bounding region). Since there are no existing group in the first stage, the processor 104 would accordingly create a new group (i.e., Group 1) that includes the bounding regions $b_{2,1}$ and $b_{3,1}$ (step S1330 and S1340). Next, the processor 104 may exclude the specific correlation coefficient (i.e., 0.95) from the correlation coefficients and exclude the specific region pair (which includes the bounding regions $b_{2,1}$ and $b_{3,1}$) from the region pairs (step S1380). Since the region pairs are not empty, the processor 104 may perform step S1390 to return to step S1310, which leads to Stage 2 in FIG. 13D.

In Stage 2 of FIG. 13D, since the correlation coefficient of 0.95 has been excluded, the specific correlation coefficient retrieved by the processor 104 may be 0.91 (step S1310), i.e., the highest correlation coefficient in the remaining correlation coefficients. Accordingly, the processor 104 may retrieve the related specific region pair (step S1320), which includes the bounding regions $b_{1,1}$ and $b_{2,1}$ (i.e., the first specific bounding region and the second specific bounding region). In this case, since the bounding region $b_{2,1}$ has been in an existing group (i.e., Group 1), the processor 104 may determine whether the bounding region $b_{1,1}$ corresponds to the same annotator with a member (i.e., the bounding regions $b_{2,1}$ and $b_{3,1}$) of Group 1 (step S1350). Since the bounding region $b_{1,1}$ does not corresponds to the same annotator with a member of Group 1, the processor 104 may adding the bounding region $b_{1,1}$ into Group 1 (step S1360). Next, the processor 104 may exclude the specific correlation coefficient (i.e., 0.91) from the correlation coefficients and exclude the specific region pair (which includes the bounding regions $b_{1,1}$ and $b_{2,1}$) from the region pairs (step S1380). Since the region pairs are not empty, the processor 104 may perform step S1390 to return to step S1310, which leads to Stage 3 in FIG. 13D.

In Stage 3 of FIG. 13D, based on the teachings in the above, the specific correlation coefficient would be 0.87, and the specific region pair would be the region pair including the bounding regions $b_{1,2}$ and $b_{2,2}$). According to a procedure similar to those performed in Stage 1, the processor 104 would create a new group (i.e., Group 2) that includes the bounding regions $b_{1,2}$ and $b_{2,2}$. Next, the processor 104 may exclude the specific correlation coefficient (i.e., 0.87) from the correlation coefficients and exclude the specific region pair (which includes the bounding regions $b_{1,2}$ and $b_{2,2}$) from the region pairs (step S1380). Since the region pairs are not empty, the processor 104 may perform step S1390 to return to step S1310, which leads to Stage 4 in FIG. 13D.

In Stage 4, the specific correlation coefficient would be 0.86, and the specific region pair would be the region pair including the bounding regions $b_{3,1}$ and $b_{1,1}$). Since the bounding regions $b_{3,1}$ and $b_{1,1}$ are already in Group 1, the processor 104 may directly perform step S1380 and step S1390, which leads to Stage 5 of FIG. 13D. From another perspective, since the bounding region $b_{3,1}$ already belongs to Group 1, the processor 104 may determine whether the bounding region $b_{1,1}$ corresponds to the same annotator with a member of Group 1. Since the bounding region $b_{1,1}$ corresponds to the same annotator with the member (i.e., the bounding region $b_{1,1}$ itself) of Group 1, the processor 104 may neglect the specific region pair including the bounding regions $b_{3,1}$ and $b_{1,1}$.

In Stage 5 of FIG. 13D, based on the teachings in the above, the specific correlation coefficient would be 0.84, and the specific region pair would be the region pair including the bounding regions $b_{3,4}$ and $b_{1,3}$. According to a procedure similar to those performed in Stage 1, the processor 104 would create a new group (i.e., Group 3) that includes the bounding regions $b_{3,4}$ and $b_{1,3}$. Next, the processor 104 may exclude the specific correlation coefficient (i.e., 0.84) from the correlation coefficients and exclude the specific region pair (which includes the bounding regions $b_{3,4}$ and $b_{1,3}$) from the region pairs (step S1380). Since the region pairs are not empty, the processor 104 may perform step S1390 to return to step S1310, which leads to Stage 6 in FIG. 13D.

In Stage 6 of FIG. 13D, the specific correlation coefficient would be 0.82, and the specific region pair would be the region pair including the bounding regions $b_{2,2}$ and $b_{3,2}$). Since the bounding region $b_{2,2}$ already belongs to Group 2, the processor 104 may determine whether the bounding region $b_{3,2}$ corresponds to the same annotator with a member of Group 2 (step S1350). Since the bounding region $b_{3,2}$ does not correspond to the same annotator with any of the member of Group 2, the processor 104 may add the bounding region $b_{3,2}$ into Group 2 (step S1360). Next, the processor 104 may exclude the specific correlation coefficient (i.e., 0.82) from the correlation coefficients and exclude the specific region pair (which includes the bounding regions $b_{2,2}$ and $b_{3,2}$) from the region pairs (step S1380). Since the region pairs are not empty, the processor 104 may perform step S1390 to return to step S1310, which leads to Stage 7 in FIG. 13D.

In Stage 7 of FIG. 13D, the specific correlation coefficient would be 0.78, and the specific region pair would be the region pair including the bounding regions $b_{3,3}$ and $b_{1,2}$). Since the bounding region $b_{1,2}$ already belongs to Group 2, the processor 104 may determine whether the bounding region $b_{3,3}$ corresponds to the same annotator with a member of Group 2. Since the bounding region $b_{3,3}$ corresponds to the same annotator with the member (i.e., the bounding region $b_{3,2}$) of Group 2, the processor 104 may neglect the specific region pair including the bounding regions $b_{3,3}$ and $b_{1,2}$. Next, the processor 104 may exclude the specific correlation coefficient (i.e., 0.78) from the correlation coefficients and exclude the specific region pair (which includes the bounding regions $b_{3,3}$ and $b_{1,2}$) from the region pairs (step S1380). Since the region pairs are not empty, the processor 104 may perform step S1390 to return to step S1310, which leads to Stage 8 in FIG. 13D.

In Stage 8 of FIG. 13D, the specific correlation coefficient would be 0.67, and the specific region pair would be the region pair including the bounding regions $b_{2,2}$ and $b_{3,3}$). Since the bounding region $b_{2,2}$ already belongs to Group 2, the processor 104 may determine whether the bounding region $b_{3,3}$ corresponds to the same annotator with a member of Group 2. Since the bounding region $b_{3,3}$ corresponds to the same annotator with the member (i.e., the bounding region $b_{3,2}$) of Group 2, the processor 104 may neglect the specific region pair including the bounding regions $b_{2,2}$ and $b_{3,3}$. Next, the processor 104 may exclude the specific correlation coefficient (i.e., 0.67) from the correlation coefficients and exclude the specific region pair (which includes the bounding regions $b_{2,2}$ and $b_{3,3}$) from the region pairs (step S1380). Since the region pairs are not empty, the processor 104 may perform step S1390 to return to step S1310, which leads to Stage 9 in FIG. 13D.

In Stage 9, the specific correlation coefficient would be 0.63, and the specific region pair would be the region pair including the bounding regions $b_{3,2}$ and $b_{1,2}$). Since the bounding regions $b_{3,2}$ and $b_{1,2}$ are already in Group 2, the processor 104 may directly perform step S1380 and step S1390. From another perspective, since the bounding region $b_{3,2}$ already belongs to Group 2, the processor 104 may determine whether the bounding region $b_{1,2}$ corresponds to the same annotator with a member of Group 2. Since the bounding region $b_{1,2}$ corresponds to the same annotator with the member (i.e., the bounding region $b_{1,2}$ itself) of Group 2, the processor 104 may neglect the specific region pair including the bounding regions $b_{3,2}$ and $b_{1,2}$. Since there no unconsidered region pairs, the processor 104 may determine that the procedure of merging the bounding regions into the groups has been completed after performing step S1390.

More specifically, after the processor 104 performs the above operations, the bounding regions of the annotators 1, 2, and 3 would be merged into Group 1, Group 2, and Group 3, wherein Group 1 includes the bounding regions $b_{2,1}$, $b_{3,1}$ and $b_{1,1}$, Group 2 includes the bounding regions $b_{1,2}$, $b_{2,2}$ and $b_{3,2}$, and Group 3 includes the bounding regions $b_{3,4}$ and $b_{1,3}$.

Afterwards, for each group, the processor 104 may generate a reference region for identifying one of the target objects based on the bounding regions in each group.

Figure 14:
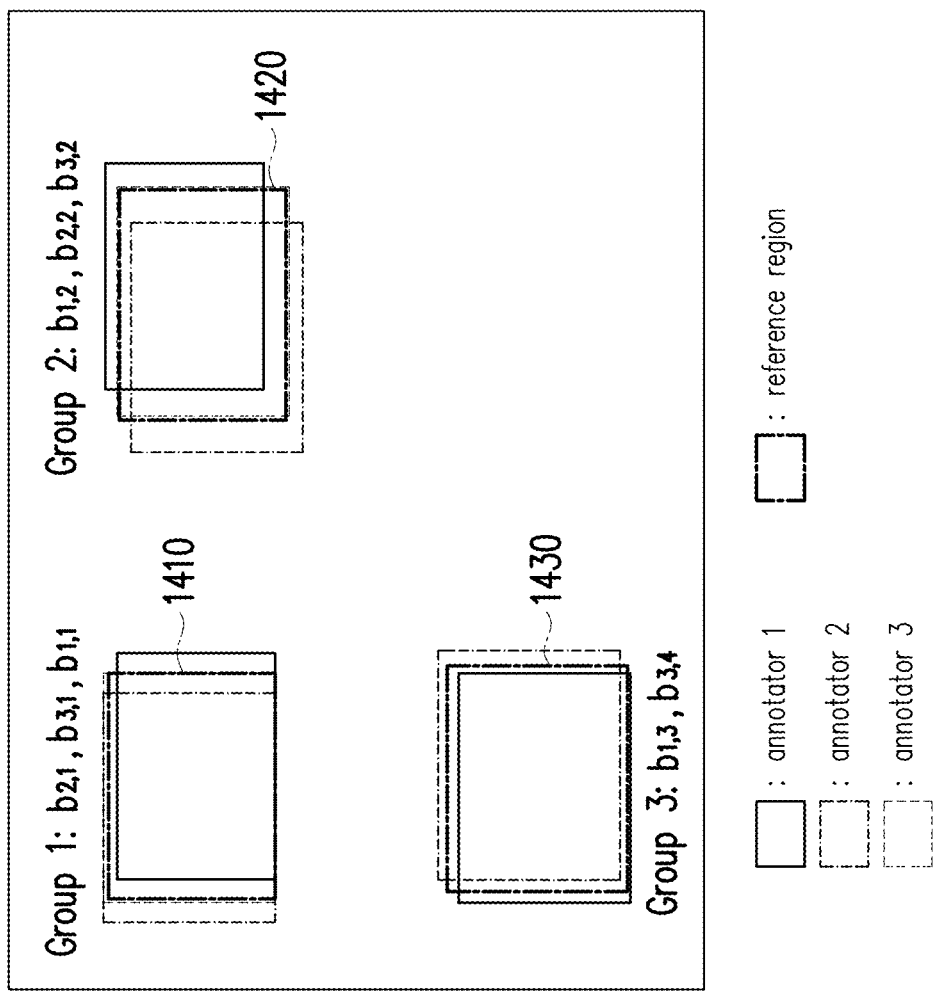
FIG. 14 shows the obtained reference regions of each group according to FIG. 13D.

See FIG. 14, which shows the obtained reference regions of each group according to FIG. 13D. Taking Group 1 as an example, the processor 104 may take an average of the bounding regions $b_{2,1}$, $b_{3,1}$ and $b_{1,1}$ to obtain the reference region 1410 of Group 1. In one embodiment, the bounding regions $b_{2,1}$, $b_{3,1}$ and $b_{1,1}$ may be characterized as coordinates, and the reference region 1410 may be obtained by calculating an average of the coordinates, but the disclosure is not limited thereto. Based on the same principle, the processor 104 may obtain reference regions 1420 and 1430 that respectively corresponds to Group 2 and Group 3. Therefore, the processor 104 may identify the target object in the raw data, and accordingly generate valid labelled data (which includes labels that correspond to different target objects such as regions 1410, 1420, and 1430) for training the AI machine.

After the processor 104 obtains the reference regions 1410-1430 for identifying target objects in the first labelled result 1110, in step S1220, the processor 104 may determine a consistency score of the first labelled result 1110 based on the at least one target object of each object category and the at least one bounding region labelled by the annotators 1, 2, and 3.

Figure 15:
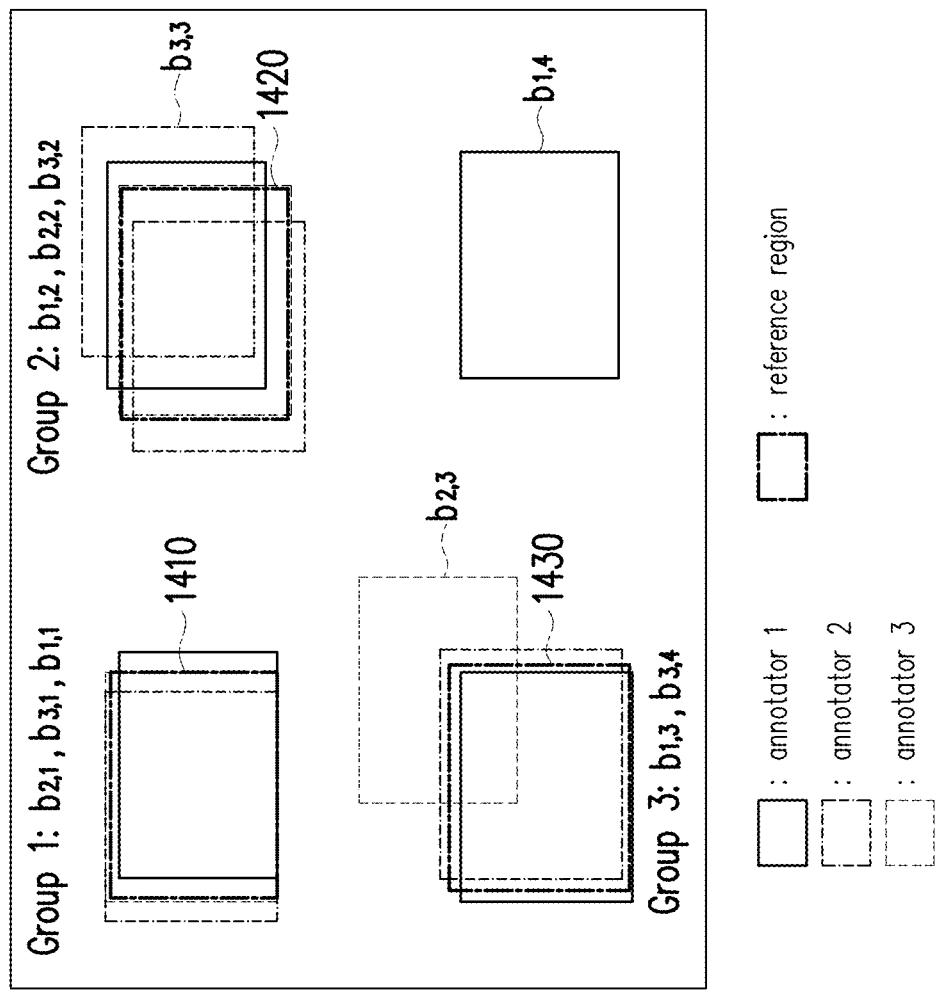
FIG. 15 shows all bounding regions according to FIG. 11 and FIG. 14.

In one embodiment, for each annotator, the processor 104 may calculate a first consistency score of each object category based on the target object of each object category and the bounding regions, and the processor 104 may take an average of the first consistency score of each object category to obtain a second consistency score. FIG. 15 will be used as an example for further discussions.

See FIG. 15, which shows all bounding regions according to FIG. 11 and FIG. 14. Taking FIG. 15 and the annotator 1 as an example, since it is assumed that the target objects corresponding to the reference regions 1410-1430 in FIG. 15 belong to one object category, the processor 104 may calculate the first consistency score of this object category based on the target objects identified by the reference regions 1410-1430 and the bounding regions labelled by the annotator 1.

In one embodiment, the first consistency score of the annotator 1 may be used to determine whether the annotator 1 is reliable for labelling. For example, in response to determining that the first consistency score is lower than a certain threshold, the processor 104 may determine that the annotator 1 is unreliable for labelling, and vice versa. In some embodiment, if the annotator 1 is determined to be unreliable for labelling, the labelled data generated by the annotator 1 would be excluded from training the AI machine, and vice versa, but the disclosure is not limited thereto.

In one embodiment, the first consistency score of the annotator 1 may be obtained by dividing a first number with a second number, wherein the second number is a sum of the first number, a third number and a fourth number.

In the present embodiment, the first number characterizes a number of the bounding regions of the annotator 1 that matches the identified target object of the object category. From another perspective, for the annotator 1, the first number may be regarded as a number of the bounding regions that are grouped In FIG. 15, for the three groups used for generating the reference regions 1410-1430, since there are three bounding regions $b_{1,1}$, $b_{1,2}$ and $b_{1,3}$ in the groups, the processor 104 may determine that the number of the bounding regions of the annotator 1 that matches the identified target object of the object category to be 3. That is, the first number of the annotator 1 is 3.

In addition, the third number may be a number of the identified target object that does not match any of the bounding regions of the annotator 1. From another perspective, for the annotator 1, the third number may be a number of the groups that fail to include the bounding regions of the annotator 1 among the groups. In FIG. 15, since all of the target objects match the bounding regions of the annotator 1, the third number would be 0, which means that all of the groups include the bounding regions of the annotator 1. The fourth number may be a number of the bounding regions of the annotator 1 that does not match any of the identified target object. From another perspective, for the annotator 1, the fourth number may be a number of the bounding regions that are not grouped. In FIG. 15, since there is one bounding region (i.e., the bounding region $b_{1,4}$) of the annotator 1 that does not match any of the identified target object, the fourth number would be 1, which means that the number of the bounding regions of the annotator 1 that are not grouped is 1.

Therefore, the first consistency score of the annotator 1 of the object category would be $$\frac{3}{3+0+1} = 0.75.$$

Moreover, since it is assumed that there is only one object category in the first labelled result, the second consistency score of the annotator 1 of all object category would be equal to the first consistency score.

In other embodiments, if the identified target objects in a labelled result is determined to belong to multiple object categories, for a certain annotator, the processor 104 may calculate the first consistency score of the certain annotator of each object category, and taking an average of the first consistency score of each object category as the second consistency score of the considered labelled result of the certain annotator.

Taking FIG. 15 and the annotator 2 as another example, since it is assumed that the target objects corresponding to the reference regions 1410-1430 in FIG. 15 belong to one object category, the processor 104 may calculate the first consistency score of this object category based on the target objects identified by the reference regions 1410-1430 and the bounding regions labelled by the annotator 2.

In one embodiment, the first consistency score of the annotator 2 may be obtained based on a procedure similar to the procedure of obtaining the first consistency score of the annotator 1. That is, the first consistency score of the annotator 2 may be obtained by dividing a first number with a second number, wherein the second number is a sum of the first number, a third number and a fourth number.

In FIG. 15, for the three groups used for generating the reference regions 1410-1430, since there are two bounding regions $b_{2,1}$ and $b_{2,2}$ in the groups, the processor 104 may determine that the number of the bounding regions of the annotator 2 that matches the identified target object of the object category to be 2. That is, the first number of the annotator 2 is 2.

In addition, the third number may be a number of the identified target object that does not match any of the bounding regions of the annotator 2. In FIG. 15, since there is one identified target object (which corresponds to the reference region 1430) that does not match any of the bounding regions of the annotator 2, the third number would be 1, which means that one of the groups fails to include the bounding regions of the annotator 2. Next, since there is one bounding region (i.e., the bounding region $b_{2,3}$) of the annotator 2 that does not match any of the identified target object, the fourth number would be 1, which means that the number of the bounding regions of the annotator 2 that fails to be grouped is 1.

Therefore, the first consistency score of the annotator 2 of the object category would be $$\frac{2}{2+1+1} = 0.5.$$

Moreover, since it is assumed that there is only one object category in the first labelled result, the second consistency score of the annotator 2 of all object category would be equal to the first consistency score.

Taking FIG. 15 and the annotator 3 as yet another example, since it is assumed that the target objects corresponding to the reference regions 1410-1430 in FIG. 15 belong to one object category, the processor 104 may calculate the first consistency score of this object category based on the target objects identified by the reference regions 1410-1430 and the bounding regions labelled by the annotator 3.

In one embodiment, the first consistency score of the annotator 3 may be obtained based on a procedure similar to the procedure of obtaining the first consistency score of the annotator 1. That is, the first consistency score of the annotator 3 may be obtained by dividing a first number with a second number, wherein the second number is a sum of the first number, a third number and a fourth number.

In FIG. 15, for the three groups used for generating the reference regions 1410-1430, since there are three bounding regions $b_{3,1}$, $b_{3,2}$ and $b_{3,4}$ in the groups, the processor 104 may determine that the number of the bounding regions of the annotator 3 that matches the identified target object of the object category to be 3. That is, the first number of the annotator 3 is 3.

In addition, the third number may be a number of the identified target object that does not match any of the bounding regions of the annotator 3. In FIG. 15, since there is no identified target object that does not match any of the bounding regions of the annotator 3, the third number would be 0. Next, since there is one bounding region (i.e., the bounding region $b_{3,3}$) of the annotator 3 that does not match any of the identified target object, the fourth number would be 1.

Therefore, the first consistency score of the annotator 3 of the object category would be $$\frac{3}{3+0+1} = 0.75.$$

In some embodiments, the first consistency score of the annotator 3 may be used to determine whether the annotator 3 should be excluded from the labelling tasks. For example, if the first consistency score of the annotator 3 is lower than a specific threshold, the annotator 3 may be determined to be unreliable for performing the labelling tasks. Moreover, since it is assumed that there is only one object category in the first labelled result, the second consistency score of the annotator 3 of all object category would be equal to the first consistency score.

After the second consistency score of each of the annotators 1, 2, and 3 is obtained, the processor 104 may take an average of the second consistency score of each annotator to obtain the consistency score of the first labelled result 1110. In FIG. 15, the consistency score of the first labelled result 1110 may be calculated as $$\frac{0.75 + 0.5 + 0.75}{3} = 0.66.$$

With the consistency score of the first labelled result 1110, the processor 104 may determine whether the consistency score of the first labelled result 1110 is higher than a score threshold. In various embodiments, the score threshold may be determined to be any value that is high enough for the designer to think that the labelling operations between the annotators are consistent, but the disclosure is not limited thereto.

In step S1230, in response to the consistency score of the first labelled result 1110 being higher than the score threshold, the processor 104 may determine that the first labelled result 1110 is valid for training the AI machine. Afterwards, step S240 in FIG. 2 may be subsequently performed. On the other hand, if the consistency score of the first labelled result 1110 is not higher than the score threshold, the processor 104 may determine that the first labelled result 1110 is not valid for training the AI machine, and hence step S250 in FIG. 2 may be subsequently performed. The details related to step S240 and S250 may be referred to the teaching described in the above embodiments, which would not be repeated herein.

In other embodiments, for a dataset that includes multiple labelled results, the processor 104 may calculate the consistency score of each labelled result based on the teachings in the above and calculate an overall consistency score of the dataset by taking an average of the consistency score of each labelled result. As a result, the administrator may accordingly determine whether the dataset as a whole is appropriate for examining the ability of the annotators or for training the AI machine, but the disclosure is not limited thereto.

In another embodiment, the reference region may be determined in other ways. Taking the Group 1 in FIG. 14 as an example, the region 1410 shown therein may be regarded as a standard region (which is not the aforementioned reference region), and the processor 104 may accordingly calculate three correlation coefficients (e.g., IoU values), which include the correlation coefficient between the bounding region $b_{2,1}$ and the standard region, the correlation coefficient between the bounding region $b_{3,1}$ and the standard region, and the correlation coefficient between the bounding region $b_{1,1}$ and the standard region. Since the correlation coefficient between the bounding region $b_{2,1}$ and the standard region is the highest (i.e., the overlapped area between the bounding region $b_{2,1}$ and the standard region is the largest), the processor 104 may consider the bounding region $b_{2,1}$ as the reference region. Similarly, for the Group 2, the processor 104 may determine the bounding region $b_{2,2}$ to be the reference region since the correlation coefficient between the standard region (i.e., the region 1420) and the bounding region $b_{2,2}$ is highest (i.e., the overlapped area between the bounding region $b_{2,2}$ and the standard region is the largest) among the correlation coefficients between the standard region (i.e., the region 1420) and each of the bounding regions $b_{1,2}$, $b_{2,2}$, and $b_{3,2}$. Similarly, for the Group 3, the processor 104 may determine the bounding region $b_{1,3}$ to be the reference region since the correlation coefficient between the standard region (i.e., the region 1430) and the bounding region $b_{1,3}$ is highest (i.e., the overlapped area between the bounding region $b_{1,3}$ and the standard region is the largest) among the correlation coefficients between the standard region (i.e., the region 1430) and each of the bounding regions $b_{3,4}$, and $b_{1,3}$. After the reference regions are determined, the processor 104 may calculate the consistency score of the aforementioned labelled results and the overall consistency score of the dataset, and details about how to calculate the consistency scores may be referred to the teachings in the above, which would not be repeated herein.

In yet another embodiment, each target object is not necessarily to be labelled by at least two annotators, but may be labelled by at least one annotator. The bounding regions $b_{2,3}$, $b_{3,4}$, and $b_{1,3}$ in FIG. 11 would be used as examples. Based on the teachings in the above, the bounding regions $b_{3,4}$, and $b_{1,3}$ may be determined, by the processor 104, to correspond to the same target object based on the correlation coefficients since the correlation coefficient between the bounding regions s $b_{3,4}$, and $b_{1,3}$ is higher than the correlation threshold. However, in this case, even though the correlation coefficients between the bounding region $b_{2,3}$ and each of the bounding regions $b_{3,4}$ and $b_{1,3}$ is not higher than the correlation threshold (e.g., 0.3, 0.5 or other values as mentioned in the above), the bounding region $b_{2,3}$ is regarded as correspond to another target object. In brief, the processor 104 may determine whether two bounding regions in a region pair correspond to the same target object or different target objects based on whether the correlation coefficient of the region pair is higher than a correlation threshold. In this embodiment, except for the bounding regions $b_{2,1}$, $b_{3,1}$, and $b_{1,1}$ (merged as the Group 1) being considered as correspond to a first target object, the bounding regions $b_{1,2}$, $b_{2,2}$, and $b_{3,2}$ (merged as the Group 2) being considered as correspond to a second target object, and the bounding regions $b_{3,4}$ and $b_{1,3}$ (merged as the Group 3) being considered as correspond to a third target object, the bounding regions $b_{3,3}$, $b_{2,3}$, and $b_{1,4}$ are considered by the processor 104 as corresponding to different target objects, respectively. Regarding the bounding regions $b_{2,1}$, $b_{3,1}$, and $b_{1,1}$, the bounding regions $b_{1,2}$, $b_{2,2}$, and $b_{3,2}$, and the bounding regions $b_{3,4}$ and $b_{1,3}$, based on the teachings in the above, the processor 104 may accordingly generates reference regions respectively corresponding to the bounding regions $b_{2,1}$, $b_{3,1}$, and $b_{1,1}$, the bounding regions $b_{1,2}$, $b_{2,2}$, and $b_{3,2}$, and the bounding regions $b_{3,4}$ and $b_{1,3}$. The reference regions are used by the processor 104 to identify target objects. Therefore, the processor 104 may identify every possible target objects in the raw data 1111 to generate valid labelled data to train the AI machine.

Figure 16:
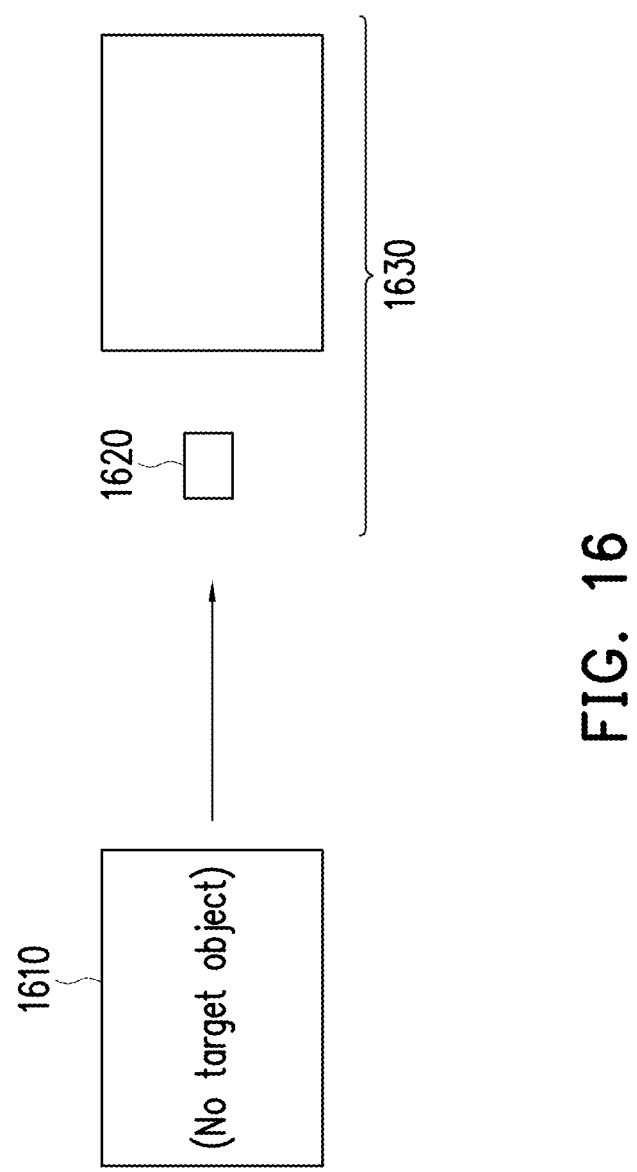
FIG. 16 shows a schematic view of handling a situation of no target object according to an embodiment of the disclosure.

See FIG. 16, which shows a schematic view of handling a situation of no target object according to an embodiment of the disclosure. In the present embodiment, the processor 104 may provide a function (e.g., a specific button) for an annotator to choose if the annotator believes that there are no target object exists in a raw data 1610. In this case, the processer 104 would equivalently treat this situation as the annotator has labelled a virtual bounding region 1620 at a specific position outside of the raw data 1610 to generate a labelled result 1630.

In one embodiment, if the annotator is asked to label the target objects of multiple object categories, the processor 104 would equivalently treat the situation in FIG. 16 as the annotator has labelled the virtual bounding region 1620 of each object category at the specific position outside of the raw data 1610 to generate the labelled result 1630.

In addition, if the processer 104 determines that no reference region is suggested based on the labelled result 1630, the first consistency score of the annotator on each object category may be determined to be 1, and hence the second consistency score of the annotator of the labelled result 1630 would be 1 as well.

Figure 17:
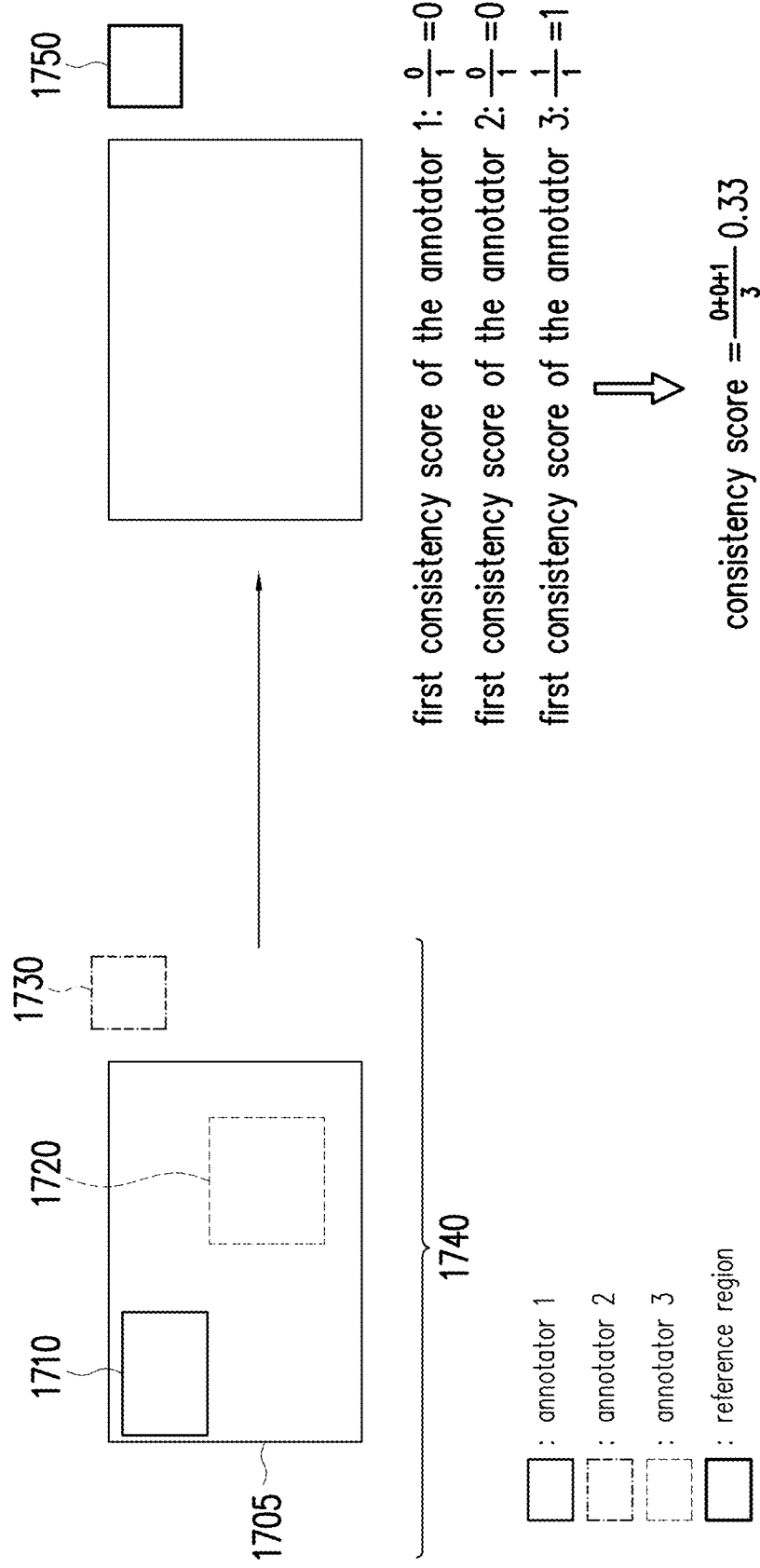
FIG. 17 shows a schematic view of handling a situation of no target object according to another embodiment of the disclosure.

See FIG. 17, which shows a schematic view of handling a situation of no target object according to another embodiment of the disclosure. In the present embodiment, the annotators 1 and 2 are assumed to draw bounding regions 1710 and 1720 in a raw data 1705. The annotator 3 is assumed to believe that there is no target object exists in the raw data 1705, and hence a virtual bounding region 1730 is generated outside of the raw data 1705. Therefore, a labelled result 1740 can be correspondingly generated.

Based on the teaching in the above, the processor 104 would determine that no reference region is suggested in the labelled result 1740. In this case, the processor 104 would generate a reference region 1750 that is identical to the virtual bounding region 1730 for facilitating the following calculations of the consistency score.

In this situation, the first/second consistency scores of the annotators 1 and 2 would be calculated as 0, and the first/second consistency scores of the annotator 3 would be calculated as 1. As a result, the consistency score of the labelled result 1740 would be calculated as 0.33.

Figure 18:
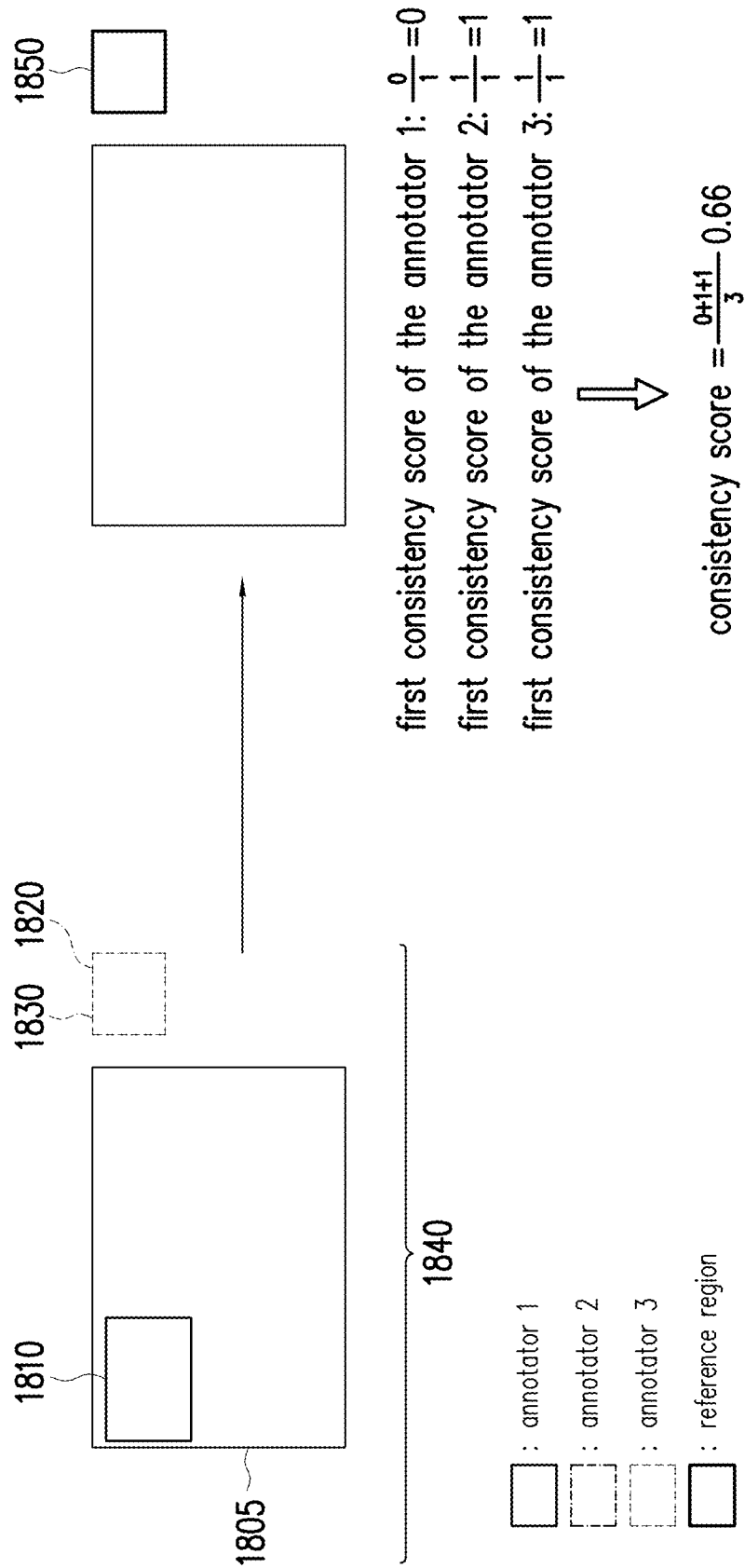
FIG. 18 shows a schematic view of handling a situation of no target object according to yet another embodiment of the disclosure.

See FIG. 18, which shows a schematic view of handling a situation of no target object according to yet another embodiment of the disclosure. In the present embodiment, the annotator 1 is assumed to label a bounding regions 1810 in a raw data 1805. The annotators 2 and 3 are assumed to believe that there is no target object exists in the raw data 1805, and hence virtual bounding regions 1820 and 1830 are generated outside of the raw data 1805, wherein the virtual bounding regions 1820 and 1830 may overlap with each other. Therefore, a labelled result 1840 can be correspondingly generated.

Based on the teaching in the above, the processer 104 would determine that no reference region is suggested in the labelled result 1840. In this case, the processor 104 would generate a reference region 1850 that is identical to the virtual bounding regions 1820 and 1830 for facilitating the following calculations of the consistency score of the labelled result 1840.

In this situation, the first/second consistency scores of the annotator 1 would be calculated as 0, and the first/second consistency scores of the annotators 2 and 3 would be calculated as 1. As a result, the consistency score of the labelled result 1840 would be calculated as 0.66.

The present disclosure further provides a computer program product for executing foregoing method for verifying training data. The computer program product is composed of a plurality of program instructions (for example, a setting program instruction and a deployment program instruction) embodied therein. These program instructions can be loaded into an electronic device and executed by the same to execute the method for verifying training data and the functions of the electronic device described above.

In summary, the disclosure may determine whether the labelled results of the annotators are valid to train the AI machine based on the consistencies of the annotators. Further, if there exist questionable raw data, unqualified annotators, or like, a notification may be accordingly created and provided to the administrators. As such, the administrators may be aware of the performances of the annotators and the quality of the raw data and correspondingly take actions, such as excluding the questionable raw data and the unqualified annotators. Moreover, when the labelled results are fed to the AI machine, the labelled results may be assigned with different weightings based the related confidence levels, such that the AI machine may decide to learn more from which of the labelled results (i.e., the labelled results with higher confidence levels).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for verifying training data, comprising:
   receiving a labelled result with a plurality of bounding regions, wherein the labelled result corresponds to an image, the bounding regions are labelled by a plurality of annotators, the annotators comprises a first annotator and a second annotator, and the bounding region comprises a first bounding region labelled by the first annotator and a second bounding region labelled by the second annotator; and
   determining the first bounding region and the second bounding region respectively corresponds to different two target objects or corresponds to one target object according to a similarity between the first bounding region and the second bounding region, comprising:
      determining a correlation coefficient of the first bounding region and the second bounding region according to a overlapped area between the first bounding region and the second bounding region;
      determining whether the correlation coefficient is larger than a correlation threshold; and
      determining the first bounding region and the second bounding region corresponds to the one target object in response to determining that the correlation coefficient is larger than the correlation threshold.

2. The method according to claim 1, wherein the step of determining the first bounding region and the second bounding region respectively corresponds to the different two target objects or the one target object according to the similarity between the first bounding region and the second bounding region comprises:
   determining the first bounding region and the second bounding region respectively corresponds to the different two target objects in response to determining that the correlation coefficient is not larger than the correlation threshold.

3. The method according to claim 1, further comprising:
   generating a reference region for identifying the one target object according to the average of the coordinates of the first bounding region and the second bounding region; and
   identifying the one target object in the image according to the reference region.

4. The method according to claim 3, further comprising:
   training an artificial intelligence machine based on the image identified with the one target object.

5. The method according to claim 2, further comprising:
   identifying the different two target objects in the image according to the coordinates of the first bounding region and the second bounding region.

6. The method according to claim 5, further comprising:
   training an artificial intelligence machine based on the image identified with the different two target objects.

7. The method according to claim 1, wherein the annotators further comprises a third annotator and the bounding region comprises a third bounding region labelled by the third annotator, and the method further comprises:
   determining the first bounding region, the second bounding region, and the third bounding region corresponds to the one target object according to the similarity between the first bounding region and the second bounding region and a similarity between the first bounding region and the third bounding region.

8. The method according to claim 7, wherein the step of determining the first bounding region, the second bounding region, and the third bounding region corresponds to the one target object according to the similarity between the first bounding region and the second bounding region and a similarity between the first bounding region and the third bounding region comprises:
   determining a first correlation coefficient of the first bounding region and the second bounding region according to a first overlapped area between the first bounding region and the second bounding region;
   determining a second correlation coefficient of the first bounding region and the third bounding region according to a second overlapped area between the first bounding region and the third bounding region;

determining whether the first correlation coefficient and the second correlation coefficient are larger than a correlation threshold; and determining the first bounding region, the second bounding region, and the third bounding region corresponds to the one target object in response to determining that the first correlation coefficient and the second correlation coefficient are larger than the correlation threshold.

9. The method according to claim 8, further comprising:

generating a standard region according to the average of the coordinates of the first bounding region, the second bounding region and the third bounding region;

determining one of the first bounding region, the second bounding region and the third bounding region as a reference region according to the overlapped area between the standard region and the first bounding region, the standard region and the second bounding region, and the standard region and the third bounding region; and identifying the one target object in the image according to the reference region.

10. A training system, comprising:

a storage circuit, storing a plurality of modules;

a processor, coupled to the storage circuit and accessing the modules to perform following steps:

receiving a labelled result with a plurality of bounding regions, wherein the labelled result corresponds to an image, the bounding regions are labelled by a plurality of annotators, the annotators comprises a first annotator and a second annotator, and the bounding region comprises a first bounding region labelled by the first annotator and a second bounding region labelled by the second annotator; and determining the first bounding region and the second bounding region respectively corresponds to different two target objects or corresponds to one target object according to a similarity between the first bounding region and the second bounding region, comprising:

determining a correlation coefficient of the first bounding region and the second bounding region according to a overlapped area between the first bounding region and the second bounding region;

determining whether the correlation coefficient is larger than a correlation threshold; and determining the first bounding region and the second bounding region corresponds to the one target object in response to determining that the correlation coefficient is larger than the correlation threshold.

11. The training system according to claim 10, wherein the processor determines the first bounding region and the second bounding region respectively corresponds to the different two target objects in response to determining that the correlation coefficient is not larger than the correlation threshold.

12. The training system according to claim 10, wherein the processor generates a reference region for identifying the one target object according to the average of the coordinates of the first bounding region and the second bounding region and identifies the one target object in the image according to the reference region.

13. The training system according to claim 12, wherein the processor trains an artificial intelligence machine based on the image identified with the one target object.

14. The training system according to claim 11, wherein the processor identifies the different two target objects in the image according to the coordinates of the first bounding region and the second bounding region and trains an artificial intelligence machine based on the image identified with the different two target objects.

15. The training system according to claim 10, wherein the annotators further comprises a third annotator and the bounding region comprises a third bounding region labelled by the third annotator, the processor determines the first bounding region, the second bounding region, and the third bounding region corresponds to the one target object according to the similarity between the first bounding region and the second bounding region and a similarity between the first bounding region and the third bounding region.

16. The training system according to claim 15, wherein the processor further perform following steps:

determining a first correlation coefficient of the first bounding region and the second bounding region according to a first overlapped area between the first bounding region and the second bounding region;

determining a second correlation coefficient of the first bounding region and the third bounding region according to a second overlapped area between the first bounding region and the third bounding region;

determining whether the first correlation coefficient and the second correlation coefficient are larger than a correlation threshold; and determining the first bounding region, the second bounding region, and the third bounding region corresponds to the one target object in response to determining that the first correlation coefficient and the second correlation coefficient are larger than the correlation threshold.

17. The training system according to claim 16, wherein the processor further perform following steps:

generating a standard region according to the average of the coordinates of the first bounding region, the second bounding region and the third bounding region;

determining one of the first bounding region, the second bounding region and the third bounding region as a reference region according to the overlapped area between the standard region and the first bounding region, the standard region and the second bounding region, and the standard region and the third bounding region; and identifying the one target object in the image according to the reference region.

18. A non-transitory computer readable medium for use in conjunction with a training system, the computer program product comprising a computer readable storage medium and an executable computer program mechanism embedded therein, the executable computer program mechanism comprising instructions for:

receiving a labelled result with a plurality of bounding regions, wherein the labelled result corresponds to an image, the bounding regions are labelled by a plurality of annotators, the annotators comprises a first annotator and a second annotator, and the bounding region comprises a first bounding region labelled by the first annotator and a second bounding region labelled by the second annotator; and determining the first bounding region and the second bounding region respectively corresponds to different two target objects or corresponds to one target object according to a similarity between the first bounding region and the second bounding region, comprising:

determining a correlation coefficient of the first bounding region and the second bounding region according to a overlapped area between the first bounding region and the second bounding region;
determining whether the correlation coefficient is larger than a correlation threshold; and
determining the first bounding region and the second bounding region corresponds to the one target object in response to determining that the correlation coefficient is larger than the correlation threshold.

* * * * *